(12) United States Patent
Jackson et al.

(10) Patent No.: US 7,783,040 B2
(45) Date of Patent: Aug. 24, 2010

(54) ENCRYPTION IN A SECURE COMPUTERIZED GAMING SYSTEM

(75) Inventors: Mark D. Jackson, Fort Collins, CO (US); Michael G. Martinek, Fort Collins, CO (US)

(73) Assignee: IGT, Reno, NV (US)

( * ) Notice: Subject to any disclaimer, the term of this patent is extended or adjusted under 35 U.S.C. 154(b) by 845 days.

(21) Appl. No.: 11/524,649

(22) Filed: Sep. 20, 2006

(65) Prior Publication Data

US 2007/0015590 A1    Jan. 18, 2007

Related U.S. Application Data

(63) Continuation of application No. 09/949,021, filed on Sep. 7, 2001, now Pat. No. 7,116,782, which is a continuation-in-part of application No. 09/520,404, filed on Mar. 8, 2000, now Pat. No. 7,043,641.

(30) Foreign Application Priority Data

Mar. 8, 2001    (WO) .................... PCT/US01/07381

(51) Int. Cl.
| | |
|---|---|
| H04K 1/00 | (2006.01) |
| H04L 9/00 | (2006.01) |
| H04L 9/28 | (2006.01) |
| H04L 9/30 | (2006.01) |
| H04L 29/06 | (2006.01) |
| H04L 9/32 | (2006.01) |
| A63F 9/24 | (2006.01) |
| A63F 13/00 | (2006.01) |
| G06F 17/00 | (2006.01) |
| G06F 19/00 | (2006.01) |

(52) U.S. Cl. .......................... 380/251; 380/28; 380/30; 713/161; 713/168; 713/181; 463/29

(58) Field of Classification Search .................. 380/251, 380/25, 28, 30; 713/161, 168, 181; 463/29
See application file for complete search history.

(56) References Cited

U.S. PATENT DOCUMENTS 2,235,642 A    3/1941    Lintern et al.

(Continued)

FOREIGN PATENT DOCUMENTS

AU    2001255294 B2    11/2001

(Continued)

OTHER PUBLICATIONS

Answer and Counterclaims to Second Amended Complaint filed in connection with Civil Action No. CV-S-01-1498, (pp. 1-3, 50-68 and 85-86).

(Continued)

*Primary Examiner*—Shin-Hon Chen
(74) *Attorney, Agent, or Firm*—Weaver Austin Villeneuve & Sampson LLP

(57) ABSTRACT

The present invention provides an architecture and method for a gaming-specific platform that features secure storage and verification of game code and other data, provides the ability to securely exchange data with a computerized wagering gaming system, and does so in a manner that is straightforward and easy to manage. Some embodiments of the invention provide the ability to identify game program code as certified or approved, such as by the Nevada Gaming Regulations Commission or other regulatory agency. The invention provides these and other functions by use of encryption, including digital signatures and hash functions as well as other encryption methods.

15 Claims, 10 Drawing Sheets

U.S. PATENT DOCUMENTS

| | | |
|---|---|---|
| 3,825,905 A | 7/1974 | Allen, Jr. |
| 3,838,264 A | 9/1974 | Maker |
| 3,931,504 A | 1/1976 | Jacoby |
| 4,072,930 A | 2/1978 | Lucero et al. |
| 4,193,131 A | 3/1980 | Lennon et al. |
| 4,200,770 A | 4/1980 | Hellman et al. |
| 4,218,582 A | 8/1980 | Hellman et al. |
| 4,250,563 A | 2/1981 | Struger |
| 4,293,928 A | 10/1981 | Baun |
| 4,296,930 A | 10/1981 | Frederiksen |
| 4,354,251 A | 10/1982 | Hellwig et al. |
| 4,355,390 A | 10/1982 | Hellwig et al. |
| 4,378,940 A | 4/1983 | Gluz et al. |
| 4,405,829 A | 9/1983 | Rivest et al. |
| 4,430,728 A | 2/1984 | Beitel et al. |
| 4,454,594 A | 6/1984 | Heffron et al. |
| 4,458,315 A | 7/1984 | Uchenick |
| 4,462,076 A | 7/1984 | Smith, III |
| 4,467,424 A | 8/1984 | Hedges et al. |
| 4,494,114 A | 1/1985 | Kaish et al. |
| 4,500,933 A | 2/1985 | Chan |
| 4,519,077 A | 5/1985 | Amin |
| 4,525,599 A | 6/1985 | Curran et al. |
| 4,582,324 A | 4/1986 | Koza et al. |
| 4,607,844 A | 8/1986 | Fullerton |
| 4,652,998 A | 3/1987 | Koza et al. |
| 4,658,093 A | 4/1987 | Hellman |
| 4,683,550 A | 7/1987 | Jindrick et al. |
| 4,727,544 A | 2/1988 | Brunner |
| 4,752,068 A | 6/1988 | Endo |
| 4,757,505 A | 7/1988 | Marrington et al. |
| 4,759,064 A | 7/1988 | Chaum |
| 4,817,140 A | 3/1989 | Chandra et al. |
| 4,837,728 A | 6/1989 | Barrie et al. |
| 4,845,715 A | 7/1989 | Francisco |
| 4,848,744 A | 7/1989 | Steininger et al. |
| 4,856,787 A | 8/1989 | Itkis |
| 4,862,355 A | 8/1989 | Newman et al. |
| 4,865,321 A | 9/1989 | Nakagawa et al. |
| 4,911,449 A | 3/1990 | Dickinson et al. |
| 4,930,073 A | 5/1990 | Cina, Jr. |
| 4,944,008 A | 7/1990 | Piosenka et al. |
| 4,951,149 A | 8/1990 | Faroudja |
| 4,972,470 A | 11/1990 | Farago |
| 5,004,232 A | 4/1991 | Wong et al. |
| 5,021,772 A | 6/1991 | King et al. |
| 5,050,212 A | 9/1991 | Dyson |
| 5,103,081 A | 4/1992 | Fisher et al. |
| 5,109,152 A | 4/1992 | Takagi et al. |
| 5,146,575 A | 9/1992 | Nolan |
| 5,155,680 A | 10/1992 | Wiedemer |
| 5,155,768 A | 10/1992 | Matsuhara |
| 5,155,856 A | 10/1992 | Bock et al. |
| 5,161,193 A | 11/1992 | Lampson et al. |
| 5,179,517 A | 1/1993 | Sarbin |
| 5,224,160 A | 6/1993 | Paulini et al. |
| 5,235,642 A | 8/1993 | Wobber et al. |
| 5,259,613 A | 11/1993 | Marnell |
| 5,264,958 A | 11/1993 | Johnson |
| 5,283,734 A | 2/1994 | Yon Kohorn |
| 5,288,978 A | 2/1994 | Iijima |
| 5,291,585 A | 3/1994 | Sato et al. |
| 5,297,205 A | 3/1994 | Audebert et al. |
| 5,326,104 A | 7/1994 | Pease et al. |
| 5,342,047 A | 8/1994 | Heidel et al. |
| 5,343,527 A | 8/1994 | Moore |
| 5,353,411 A | 10/1994 | Nakaosa et al. |
| 5,375,241 A | 12/1994 | Walsh |
| 5,379,431 A | 1/1995 | Lemon et al. |
| 5,388,841 A | 2/1995 | San et al. |
| 5,394,547 A | 2/1995 | Correnti et al. |
| 5,398,799 A | 3/1995 | Ranon et al. |
| 5,398,932 A | 3/1995 | Eberhardt et al. |
| 5,400,246 A | 3/1995 | Wilson et al. |
| 5,421,006 A | 5/1995 | Jablon et al. |
| 5,428,525 A | 6/1995 | Cappelaere et al. |
| 5,429,361 A | 7/1995 | Raven et al. |
| 5,442,568 A | 8/1995 | Ostendorf et al. |
| 5,444,642 A | 8/1995 | Montgomery et al. |
| 5,465,364 A | 11/1995 | Lathrop et al. |
| 5,469,571 A | 11/1995 | Bunnell |
| 5,473,765 A | 12/1995 | Gibbons et al. |
| 5,488,702 A | 1/1996 | Byers et al. |
| 5,489,095 A | 2/1996 | Goudard et al. |
| 5,497,490 A | 3/1996 | Harada et al. |
| 5,498,003 A | 3/1996 | Gechter |
| 5,507,489 A | 4/1996 | Reibel et al. |
| 5,508,689 A | 4/1996 | Rado et al. |
| 5,542,669 A | 8/1996 | Charron et al. |
| 5,548,782 A | 8/1996 | Michael et al. |
| 5,553,290 A | 9/1996 | Calvert et al. |
| 5,564,701 A | 10/1996 | Dettor |
| 5,568,602 A | 10/1996 | Callahan et al. |
| 5,575,717 A | 11/1996 | Houriet, Jr. et al. |
| 5,586,766 A | 12/1996 | Forte et al. |
| 5,586,937 A | 12/1996 | Menashe |
| 5,594,903 A | 1/1997 | Bunnell et al. |
| 5,595,389 A | 1/1997 | Parulski et al. |
| 5,604,801 A | 2/1997 | Dolan et al. |
| 5,611,730 A | 3/1997 | Weiss |
| 5,634,058 A | 5/1997 | Allen et al. |
| 5,643,086 A | 7/1997 | Alcorn et al. |
| 5,644,704 A | 7/1997 | Pease et al. |
| 5,655,965 A | 8/1997 | Takemoto et al. |
| 5,664,187 A | 9/1997 | Burkes et al. |
| 5,668,945 A | 9/1997 | Ohba et al. |
| 5,671,351 A | 9/1997 | Wild et al. |
| 5,688,174 A | 11/1997 | Kennedy |
| 5,702,303 A | 12/1997 | Takemoto et al. |
| 5,704,835 A | 1/1998 | Dietz, II |
| 5,707,286 A | 1/1998 | Carlson |
| 5,707,288 A | 1/1998 | Stephens |
| 5,725,428 A | 3/1998 | Achmuller |
| 5,737,418 A | 4/1998 | Saffari et al. |
| 5,742,616 A | 4/1998 | Torreiter et al. |
| 5,742,825 A | 4/1998 | Mathur et al. |
| 5,752,882 A | 5/1998 | Acres et al. |
| 5,758,875 A | 6/1998 | Giacalone, Jr. |
| 5,759,102 A | 6/1998 | Pease et al. |
| 5,761,647 A | 6/1998 | Boushy |
| 5,768,382 A | 6/1998 | Schneier et al. |
| 5,770,533 A | 6/1998 | Franchi |
| 5,778,226 A | 7/1998 | Adams et al. |
| 5,778,228 A | 7/1998 | Wei |
| 5,800,268 A | 9/1998 | Molnick |
| 5,809,329 A | 9/1998 | Lichtman et al. |
| 5,823,874 A | 10/1998 | Adams |
| 5,848,250 A | 12/1998 | Smith et al. |
| 5,848,932 A | 12/1998 | Adams |
| 5,851,149 A | 12/1998 | Xidos et al. |
| 5,863,041 A | 1/1999 | Boylan et al. |
| 5,870,587 A | 2/1999 | Danforth et al. |
| 5,871,400 A | 2/1999 | Yfantis |
| 5,872,973 A | 2/1999 | Mitchell et al. |
| 5,879,234 A | 3/1999 | Mengual |
| 5,889,990 A | 3/1999 | Coleman et al. |
| 5,893,121 A | 4/1999 | Ebrahim et al. |
| 5,901,319 A | 5/1999 | Hirst |
| 5,934,672 A | 8/1999 | Sines et al. |
| 5,935,224 A | 8/1999 | Svancarek et al. |
| 5,944,821 A | 8/1999 | Angelo |
| 5,954,583 A | 9/1999 | Green |
| 5,970,143 A | 10/1999 | Schneier et al. |
| 5,971,851 A | 10/1999 | Pascal |

| | | | | | | |
|---|---|---|---|---|---|---|
| 5,980,384 | A | 11/1999 | Barrie | 6,394,907 B1 | 5/2002 | Rowe |
| 5,984,786 | A | 11/1999 | Ehrman | 6,401,208 B2 | 6/2002 | Davis et al. |
| 5,989,234 | A | 11/1999 | Valerio et al. | 6,409,602 B1 | 6/2002 | Wiltshire et al. |
| 5,991,399 | A | 11/1999 | Graunke et al. | 6,446,211 B1 | 9/2002 | Colvin |
| 5,991,546 | A | 11/1999 | Chan et al. | 6,446,257 B1 | 9/2002 | Pradhan et al. |
| 5,995,745 | A | 11/1999 | Yodaiken | 6,449,687 B1 | 9/2002 | Moriya |
| 5,999,990 | A | 12/1999 | Sharrit et al. | 6,453,319 B1 | 9/2002 | Mattis et al. |
| 6,003,038 | A | 12/1999 | Chen | 6,454,648 B1 | 9/2002 | Kelly et al. |
| 6,006,279 | A | 12/1999 | Hayes | 6,460,142 B1 | 10/2002 | Colvin |
| 6,008,279 | A | 12/1999 | Shimizu et al. | 6,484,264 B1 | 11/2002 | Colvin |
| 6,014,714 | A | 1/2000 | Pyler et al. | 6,496,808 B1 * | 12/2002 | Aiello et al. .................. 705/67 |
| 6,015,344 | A | 1/2000 | Kelly et al. | 6,502,195 B1 | 12/2002 | Colvin |
| 6,021,414 | A | 2/2000 | Fuller | 6,505,087 B1 | 1/2003 | Lucas et al. |
| 6,026,238 | A | 2/2000 | Bond et al. | 6,510,521 B1 * | 1/2003 | Albrecht et al. ............. 713/193 |
| 6,035,321 | A | 3/2000 | Mays | 6,527,638 B1 * | 3/2003 | Walker et al. ................ 463/25 |
| 6,039,645 | A | 3/2000 | Mazur | 6,532,542 B1 * | 3/2003 | Thomlinson et al. ........ 713/187 |
| 6,039,648 | A | 3/2000 | Guinn et al. | 6,577,733 B1 | 6/2003 | Charrin |
| 6,044,428 | A | 3/2000 | Rayabhari | 6,595,856 B1 * | 7/2003 | Ginsburg et al. ............. 463/29 |
| 6,044,471 | A | 3/2000 | Colvin | 6,620,047 B1 | 9/2003 | Alcorn et al. |
| 6,052,778 | A | 4/2000 | Hagy et al. | 6,671,745 B1 | 12/2003 | Mathur et al. |
| 6,071,190 | A | 6/2000 | Weiss et al. | 6,785,825 B2 | 8/2004 | Colvin |
| 6,073,124 | A | 6/2000 | Krishnan et al. | 6,792,548 B2 | 9/2004 | Colvin |
| 6,075,939 | A | 6/2000 | Bunnell et al. | 6,792,549 B2 | 9/2004 | Colvin |
| 6,081,895 | A * | 6/2000 | Harrison et al. ............. 713/189 | 6,795,925 B2 | 9/2004 | Colvin |
| 6,089,975 | A | 7/2000 | Dunn | 6,795,928 B2 | 9/2004 | Bradley et al. |
| 6,091,930 | A | 7/2000 | Mortimer et al. | 6,799,277 B2 | 9/2004 | Colvin |
| 6,099,408 | A | 8/2000 | Schneier et al. | 6,804,763 B1 | 10/2004 | Stockdale et al. |
| 6,102,796 | A | 8/2000 | Pajitnov et al. | 6,805,634 B1 | 10/2004 | Wells et al. |
| 6,104,815 | A | 8/2000 | Alcorn et al. | 6,813,717 B2 | 11/2004 | Colvin |
| 6,104,859 | A | 8/2000 | Yoshida et al. | 6,813,718 B2 | 11/2004 | Colvin |
| 6,106,396 | A | 8/2000 | Alcorn et al. | 6,851,607 B2 | 2/2005 | Orus et al. |
| 6,115,601 | A | 9/2000 | Ferreira | 6,857,078 B2 | 2/2005 | Colvin et al. |
| 6,117,010 | A | 9/2000 | Canterbury et al. | 6,866,581 B2 | 3/2005 | Martinek et al. |
| 6,126,548 | A | 10/2000 | Jacobs et al. | 6,902,481 B2 | 6/2005 | Breckner et al. |
| 6,134,677 | A | 10/2000 | Lindsay | 6,908,391 B2 | 6/2005 | Gatto et al. |
| 6,135,884 | A | 10/2000 | Hedrick et al. | 6,935,946 B2 | 8/2005 | Yoseloff |
| 6,135,887 | A | 10/2000 | Pease et al. | 6,962,530 B2 | 11/2005 | Jackson |
| 6,139,433 | A | 10/2000 | Miyamoto | 6,978,465 B2 | 12/2005 | Williams |
| 6,149,522 | A * | 11/2000 | Alcorn et al. .................. 463/29 | 6,988,267 B2 | 1/2006 | Harris et al. |
| 6,165,072 | A | 12/2000 | Davis et al. | 7,043,641 B1 | 5/2006 | Martinek et al. |
| 6,181,336 | B1 | 1/2001 | Chiu et al. | 7,063,615 B2 | 6/2006 | Alcorn et al. |
| 6,185,678 | B1 | 2/2001 | Arbaugh et al. | 7,116,782 B2 | 10/2006 | Jackson et al. |
| 6,193,606 | B1 | 2/2001 | Walker et al. | 7,203,841 B2 | 4/2007 | Jackson et al. |
| 6,195,587 | B1 | 2/2001 | Hruska et al. | 7,470,182 B2 | 12/2008 | Martinek et al. |
| 6,203,010 | B1 | 3/2001 | Jorasch et al. | 2001/0000118 A1 | 4/2001 | Sines et al. |
| 6,203,427 | B1 | 3/2001 | Walker et al. | 2001/0003709 A1 | 6/2001 | Adams |
| 6,210,274 | B1 | 4/2001 | Carlson | 2001/0006195 A1 | 7/2001 | Sukeda et al. |
| 6,214,495 | B1 | 4/2001 | Segawa et al. | 2001/0010046 A1 | 7/2001 | Muyres et al. |
| 6,215,495 | B1 | 4/2001 | Grantham et al. | 2001/0044339 A1 | 11/2001 | Cordero |
| 6,219,836 | B1 | 4/2001 | Wells et al. | 2001/0053712 A1 | 12/2001 | Yoseloff et al. |
| 6,222,448 | B1 | 4/2001 | Beck et al. | 2002/0049909 A1 | 4/2002 | Jackson et al. |
| 6,222,529 | B1 | 4/2001 | Ouatu-Lascar et al. | 2002/0052230 A1 | 5/2002 | Martinek et al. |
| 6,224,482 | B1 | 5/2001 | Bennett | 2002/0078142 A1 | 6/2002 | Moore et al. |
| 6,243,692 | B1 | 6/2001 | Floyd et al. | 2002/0082084 A1 | 6/2002 | Snow et al. |
| 6,249,869 | B1 * | 6/2001 | Drupsteen et al. ............ 713/172 | 2002/0116284 A1 | 8/2002 | Steelman et al. |
| 6,251,014 | B1 | 6/2001 | Stockdale et al. | 2002/0151363 A1 | 10/2002 | Letovsky et al. |
| 6,253,374 | B1 | 6/2001 | Dresevic et al. | 2003/0014639 A1 | 1/2003 | Jackson et al. |
| 6,263,392 | B1 | 7/2001 | McCauley | 2003/0069074 A1 | 4/2003 | Jackson |
| 6,264,557 | B1 * | 7/2001 | Schneier et al. ............... 463/29 | 2003/0078103 A1 | 4/2003 | LeMay et al. |
| 6,269,474 | B1 | 7/2001 | Price | 2003/0181242 A1 | 9/2003 | Lee et al. |
| 6,279,124 | B1 | 8/2001 | Brouwer et al. | 2003/0195033 A1 | 10/2003 | Gazdic et al. |
| 6,290,602 | B1 | 9/2001 | Kawano | 2003/0203755 A1 | 10/2003 | Jackson |
| 6,311,276 | B1 * | 10/2001 | Connery et al. ................ 726/2 | 2003/0203756 A1 | 10/2003 | Jackson |
| 6,315,666 | B1 | 11/2001 | Mastera et al. | 2003/0224858 A1 | 12/2003 | Yoseloff et al. |
| 6,319,125 | B1 | 11/2001 | Acres | 2004/0002381 A1 | 1/2004 | Alcorn et al. |
| 6,322,445 | B1 | 11/2001 | Miller | 2004/0038740 A1 | 2/2004 | Muir |
| 6,324,605 | B1 | 11/2001 | Rafferty et al. | 2004/0043814 A1 | 3/2004 | Angell et al. |
| 6,327,605 | B2 | 12/2001 | Arakawa et al. | 2004/0072611 A1 | 4/2004 | Wolf et al. |
| 6,331,146 | B1 | 12/2001 | Miyamoto et al. | 2004/0106452 A1 | 6/2004 | Nguyen et al. |
| 6,364,769 | B1 | 4/2002 | Weiss et al. | 2004/0198479 A1 | 10/2004 | Martinek et al. |
| 6,368,219 | B1 | 4/2002 | Szrek et al. | 2004/0198494 A1 | 10/2004 | Nguyen et al. |
| 6,379,246 | B1 | 4/2002 | Dabrowski | 2005/0192092 A1 | 9/2005 | Breckner et al. |
| 6,389,535 | B1 * | 5/2002 | Thomlinson et al. ........ 713/165 | 2006/0123391 A1 | 6/2006 | Lai |

| | | | |
|---|---|---|---|
| 2006/0287098 | A1 | 12/2006 | Morrow et al. |
| 2007/0270212 | A1 | 11/2007 | Cockerille et al. |
| 2008/0058055 | A1 | 3/2008 | LeMay et al. |
| 2008/0058097 | A1 | 3/2008 | Martinek et al. |
| 2008/0096656 | A1 | 4/2008 | LeMay et al. |
| 2008/0102919 | A1 | 5/2008 | Rowe et al. |

FOREIGN PATENT DOCUMENTS

| | | |
|---|---|---|
| DE | 37 00 861 | 7/1988 |
| DE | 40 14 477 | 7/1991 |
| EP | 0 317 477 A2 | 5/1989 |
| EP | 0 685 246 A1 | 12/1995 |
| EP | 0 762 302 A1 | 3/1997 |
| EP | 0 798 634 | 10/1997 |
| EP | 0 996 058 | 10/1998 |
| EP | 0 950 998 A2 | 10/1999 |
| EP | 0 953 930 A2 | 11/1999 |
| EP | 1 255 234 A3 | 11/2002 |
| GB | 2 072 395 | 9/1981 |
| GB | 2 202 984 | 9/1981 |
| GB | 2 121 569 | 12/1983 |
| GB | 2 147 773 | 5/1985 |
| GB | 2 201 821 | 9/1988 |
| GB | 2 253 325 A | 9/1992 |
| WO | WO 02/072395 | 9/1981 |
| WO | WO 94/19784 | 9/1994 |
| WO | WO 96/00939 | 1/1996 |
| WO | WO 96/00950 | 1/1996 |
| WO | WO 96/14614 | 5/1996 |
| WO | WO 98/00207 | 1/1998 |
| WO | WO 98/20417 | 5/1998 |
| WO | WO 99/09474 | 2/1999 |
| WO | WO 99/49394 | 9/1999 |
| WO | WO 99/65579 | 12/1999 |
| WO | WO 00/33196 | 6/2000 |
| WO | WO 01/22267 | 3/2001 |
| WO | WO 01-67218 | 9/2001 |
| WO | WO 02/32526 | 4/2002 |
| WO | WO 02/45808 | 6/2002 |
| WO | WO 02/073501 | 9/2002 |
| WO | WO 03/013677 | 2/2003 |
| WO | WO 03/023647 | 3/2003 |
| WO | WO 2004/051588 | 6/2004 |
| WO | WO 2006/002084 | 1/2006 |

OTHER PUBLICATIONS

DeLourna, "Game Programming Gems", Charles River Media, ISBN: 1-58450-049-2, 2000 (12 pgs.).
DirectX Media: Multimedia Services for Microsoft Internet Explorer and Microsoft Windows, MSDN Library, http://msdn.microsoft.com, 101998 (10 pgs.).
Levinthal, Adam and Barnett, Michael, "The Silicon Gaming Odyssey Slot Machine," Feb. 1997, *COMPCON '97 Proceedings, IEEE San Jose, CA; IEEE Comput. Soc.*, pp. 296-301.
Bernardi, Favrice et al., "Model Design Using Hierarchical Web-Based Libraries", Jun. 10-14, 2002, Annual ACM IEEE Design Automation Conference, New Orleans, Louisiana, pp. 14-17.
"Linux Kernel Glossary," entry for ZFOD (zero-fill-on-demand), http://www.kernelnewbies.org/KernelGlossary, downloaded Jul. 7, 2007 (14 pgs.).
International Search Report mailed Jun. 12, 2001 from PCT/US02/07447, 5 pgs.
International Preliminary Examination Report dated Dec. 23, 2004 for PCT/US01/07447.
U.S. Final Office Action dated Jan. 30, 2007 from related U.S. Appl. No. 10/134,657, 11 pages.
U.S. Office Action dated Jul. 31, 2007 from related U.S. Appl. No. 10/134,657, 10 pages.
EP Supplementary Search Report dated Oct. 13, 2006 from related EP Application No. 02775968.7.
EP Office Action dated Aug. 23, 2007 from related EP Application No. 02775968.7.
Bovet, D.P. et al., "Understanding the Linux Kernel" Jan. 2001, pgs. 1-34, XP002332389.
U.S. Office Action dated Jun. 17, 2005 from related U.S. Appl. No. 10/241,804.
U.S. Final Office Action dated Mar. 9, 2006 from related U.S. Appl. No. 10/241,804.
U.S. Office Action dated May 31, 2007 from related U.S. Appl. No. 10/241,804.
U.S. Office Action dated Feb. 25, 2008 from related U.S. Appl. No. 10/241,804.
U.S. Office Action dated Dec. 23, 2005 from U.S. Appl. No. 10/308,845.
U.S. Final Office Action dated Jun. 2, 2006 from related U.S. Appl. No. 10/308,845.
U.S. Office Action dated Dec. 13, 2006 from U.S. Appl. No. 10/308,845.
U.S. Final Office Action dated Aug. 13, 2008 from related U.S. Appl. No. 10/134,657, 9 pgs.
U.S. Office Action dated Jan. 22, 2009 from related U.S. Appl. No. 10/134,657, 19 pgs.
History of GSA, Web page [online]. Gaming Standards Association, 1997 [retrieved on Aug. 7, 2007] Retrieved from the Internet: <URL: http://www.gamingstandards.com/index.php?page=what_is_gsa/history_of_gsa>, 1 pg.
Value Proposition, Web page [online]. Gaming Standards Association, 1997 [retrieved on Aug. 7, 2007] Retrieved from the Internet: <URL:http://www.gamingstandards.com/index.php?page=what_is_gsa/value_proposition>, 2 pgs.
U.S. Office Action dated Nov. 22, 2005 from related U.S. Appl. No. 10/182,469.
U.S. Final Office Action dated Feb. 7, 2007 from related U.S. Appl. No. 10/182,469.
U.S. Office Action dated Aug. 14, 2007 from related U.S. Appl. No. 10/182,469.
U.S. Final Office Action dated Aug. 13, 2008 from related U.S. Appl. No. 10/182,469.
U.S. Office Action dated Apr. 28, 2009 from related U.S. Appl. No. 10/182,469.
U.S. Office Action dated Mar. 23, 2005 from U.S. Appl. No. 10/040,239.
U.S. Office Action dated Jun. 29, 2006 from U.S. Appl. No. 10/040,239.
U.S. Office Action dated Apr. 16, 2007 from U.S. Appl. No. 10/040,239.
U.S. Office Action dated Jan. 24, 2008 from U.S. Appl. No. 10/040,239.
Notice of Allowance dated Aug. 4, 2008 from U.S. Appl. No. 10/040,239.
Notice of Allowance dated Jan. 14, 2009 from U.S. Appl. No. 10/040,239.
International Search Report dated Jun. 5, 2003 from PCT Application No. PCT/US02/30782, 7 pgs.
EP Office Action dated Dec. 8, 2005 from related EP Application No. 02768907.4, 4 pgs.
AU Office Action dated Sep. 10, 2007 from AU Application No. 2002331912, 3 pgs.
U.S. Office Action dated Jan. 24, 2008 from U.S. Appl. No. 11/933,057.
U.S. Notice of Allowance dated Aug. 1, 2008 from U.S. Appl. No. 11/933,057.
U.S. Notice of Allowance dated Jan. 9, 2009 from U.S. Appl. No. 11/933,057.
U.S. Office Action dated Jul. 2, 2004 from U.S. Appl. No. 10/041,212, 12 pgs.
U.S. Notice of Allowance dated Jan. 26, 2005 from U.S. Appl. No. 10/041,212.
International Search Report dated Jun. 10, 2003 from PCT Application No. PCT/US02/30610, 7 pgs.
PCT Written Opinion dated Jul. 15, 2003 from PCT Application No. PCT/US02/30610, 2 pgs.
AU Examiner's First Report dated Sep. 7, 2007 from Application No. 2002327737.

AU Examiner's First Report dated Feb. 20, 2009 in Application No. 2003293029.
Russian Office Action mailed May 19, 2008 in Application No. 2005118989 [P088RU].
EP Office Action dated Oct. 19, 2004 from EP Application No. 02253034.9, 3 pgs.
EPO Examination Report dated Nov. 19, 2007 from related EP Application No. 02763743.8.
EP Search Report dated Dec. 12, 2003 from EP Application No. 02253034.9, 3 pgs.
EP Supplementary Partial Search Report dated Apr. 17, 2007 from EP Application No. 01918453.0-2221.
Australian Examination Report dated Jul. 10, 2007 from AU Application No. 2001245529.
U.S. Office Action mailed Dec. 4, 2000 from U.S. Appl. No. 09/405,921.
U.S. Office Action mailed Apr. 20, 2001 from U.S. Appl. No. 09/405,921.
U.S. Office Action mailed Sep. 24, 2001 from U.S. Appl. No. 09/405,921.
U.S. Office Action mailed Jun. 14, 2002 from U.S. Appl. No. 09/405,921.
U.S. Office Action mailed Apr. 2, 2003 from U.S. Appl. No. 09/405,921.
U.S. Office Action mailed Oct. 3, 2003 from U.S. Appl. No. 09/405,921.
U.S. Office Action mailed Jun. 10, 2004 from U.S. Appl. No. 09/405,921.
Notice of Allowance mailed Dec. 3, 2004 from U.S. Appl. No. 09/405,921.
U.S. Office Action mailed Apr. 14, 2003 from U.S. Appl. No. 09/847,051.
U.S. Office Action mailed Nov. 4, 2003 from U.S. Appl. No. 09/847,051.
U.S. Office Action mailed May 6, 2004 from U.S. Appl. No. 09/847,051.
U.S. Notice of Allowance mailed Nov. 4, 2004 from U.S. Appl. No. 09/847,051.
U.S. Office Action mailed Aug. 29, 2001 from U.S. Appl. No. 09/520,405.
U.S. Office Action mailed Aug. 2, 2002 from U.S. Appl. No. 09/520,405.
U.S. Office Action mailed Mar. 20, 2003 from U.S. Appl. No. 09/520,405.
U.S. Office Action mailed Sep. 8, 2003 from U.S. Appl. No. 09/520,405.
U.S. Office Action mailed Sep. 3, 2004 from U.S. Appl. No. 09/520,405.
U.S. Office Action mailed Dec. 20, 2005 from U.S. Appl. No. 09/520,405.
U.S. Office Action mailed Jul. 14, 2006 from U.S. Appl. No. 09/520,405.
U.S. Office Action mailed Mar. 7, 2007 from U.S. Appl. No. 09/520,405.
U.S. Office Action mailed Sep. 13, 2007 from U.S. Appl. No. 09/520,405.
U.S. Office Action mailed Jul. 8, 2008 from U.S. Appl. No. 09/520,405.
U.S. Office Action mailed Mar. 18, 2009 from U.S. Appl. No. 09/520,405.
U.S. Office Action mailed Nov. 10, 2004 from U.S. Appl. No. 10/827,042, 12 pgs.
U.S. Office Action mailed Jan. 19, 2006 from U.S. Appl. No. 10/827,042, 12 pgs.
U.S. Office Action mailed Feb. 12, 2007 from U.S. Appl. No. 10/827,042.
U.S. Notice of Allowance mailed Aug. 23, 2007 from U.S. Appl. No. 10/827,042.
U.S. Allowed claims from U.S. Appl. No. 10/827,042.
U.S. Supplemental Notice of Allowance mailed May 5, 2008 from U.S. Appl. No. 10/827,042.
U.S. Office Action mailed Dec. 22, 2008 from U.S. Appl. No. 10/241,804.
U.S. Notice of Allowance mailed Jul. 14, 2009 from U.S. Appl. No. 10/241,804.
"Architecture for a Video Arcade Game Network," IBM Technical Disclosure Bulletin, Apr. 1, 1991, vol. 33, No. 11, pp. 138-141, NN9104138.
Oral Proceedings Mailed Sep. 15, 2008 in European Application No. 01918453.0.
Canadian Office Action mailed Dec. 30, 2008 in Application No. 2,402,389.
Australian Office Action mailed Dec. 1, 2008 in Application No. 2008200148.
Canadian Office Action mailed Nov. 6, 2008 in Application No. 2,402,351.
Written Opinion of the International Searching Authority mailed Feb. 24, 2009 in Application No. PCT/US2008/087809.
International Search Report mailed Feb. 24, 2009 in Application No. PCT/US2008/087809.
Chatley, Robert et al., "MagicBeans: a Platform for Deploying Plugin Components," Component Deployment, Lecture Notes in Computer Science LNCS, Springer Verlag, Berlin/Heidelberg vol. 3083, May 1, 2004, pp. 97-112. Retrieved form the Internet, URL: http://pubs.doc.ic.ac.uk/MagicBeans/MagicBeans.pdf.
Examiner's First Report dated Apr. 10, 2006 from AU Application No. 2002341815.
Examiner's Second Report dated Jan. 10, 2008 from AU Application No. 2002341815.
Supplementary European Search Report dated Mar. 22, 2005 issued for EP 00 96 6846.
Office Action mailed Sep. 29, 2005 for EP Patent Application No. 00 96 6846.
Letter from foreign associate regarding office action dated Sep. 27, 2005 issued to Australian Patent Application No. 37076/02.
Statement of Grounds and Particulars in Support of Notice of Opposition filed in relation to complete Australian Application No. 2002331912 mailed May 1, 2009.
Statement of Grounds and Particulars in Support of Notice of Opposition filed in relation to complete Australian Application No. 2002327737 dated Apr. 3, 2009.
Statement of Grounds and Particulars in Support of Notice of Opposition filed in relation to complete Australian Application No. 2001245529 dated Mar. 26, 2009.
Answer and Counterclaims to Second Amended Complaint filed in connection with Civil Action No. CV-S-01-1498, pp. 1-26 and certificate of service page.
Defendants', Supplemental Response to Plaintiffs' First Set of Interrogatories filed in connection with Civil Action No. CV-S-01-1498, pp. 1-3, 50-68 and 85-86.
Davida, G. et al., "Defending Systems Against Viruses through Cryptographic Authentication," Proceedings of the Symposium on Security and Privacy, *IEEE Comp. Soc. Press*, pp. 312-318 (May 1, 1989).
Document entitled "Fact Sheet on Digital Signature Standard" dated May 1994, 6 pages.
Federal Information Processing Standards (FIPS) Publication 180-1 entitled "Secure Hash Standard" dated Apr. 17, 1995, 2 title pages, abstract page and pp. 1-21.
Federal Information Processing Standards (FIPS) Publication 180 entitled "Secure Hash Standard" dated May 11, 1993, title page abstract page and pp. 1-20.
Federal Information Processing Standards (FIPS) Publication 186 entitled "Digital Signature (DSS)" dated Jan. 27, 2000, 17 pages.
Hellman, Martin E., "The Mathematics Public-Key Cryptography," Scientific American, vol. 241, No. 8, Aug. 1979, pp. 146-152 and 154-157.
Rivest, et al., "A Method for Obtaining Digital Signatures and Public-Key Cryptosystems," Communications of the ACM, vol. 21, No. 2, Feb. 1978, pp. 120-126.
Bauspiess, et al., "Requirements for Cryptographic Hash Functions," *Computers and Security*, 5:427-437 (Sep. 11, 1992).
Complaint for patent infringement filed by Aristocrat Technologies, et al., dated Jan. 22, 2002, Civil Action No. CV-S-02-0091.
European Search Report dated Sep. 28, 2005, from corresponding EP Application No. 01918440.7 (3 pages).

Australian Office Action dated Dec. 12, 2005, from corresponding Australian Application No. 2001245518 (2 pages).

David A. Rusling, "The Linux Kernel," http://tldp.org/LDP/tlk/tlk-title.html, copyright 1996-1999, downloaded Feb. 21, 2006.

"Linux Kernel Glossary," entry for ZFOD (zero-fill-on-demand), http://www.kernelnewbies.org/glossary, downloaded Feb. 22, 2006.

International Search Reports for applications PCT/US01/07447, PCT/US01/07381 and PCT/US02/30286.

Retro Fitting a Low-Boy Arcade Machine with a Pentium-Powered M.A.M.E. Setup, Oct. 1996, www.Cygnus.uwa.edu.au/~jaycole/jaw/arcade/html (5 pages).

Michael Tiemann, "Why Embedded Linux" http://linuxdevices.com/articles/AT8926600504.html (Oct. 28, 1999) (6 pages).

Rick Lehrbaum, "Why Linux" http://linuxdevices.com/articles/AT9663974466.html (Jan. 31, 2000), pp. 1-2.

Rick Lehrbaum, "Why Linux" http://linuxdevices.com/articles/AT3611822672.html (Feb. 19, 2000), pp. 1-5.

David A. Rusling, "The Linux Kernel," http://tldp.org/LDP/tlk/tlk-title.html, copyright 1996-1999, downloaded Feb. 21, 2006.

RTD USA, www.rtdusa.com (1998), downloaded from the Internet on Mar. 20, 2003, pp. 1-49.

Mardsen, et al. Development of a PC-Windows Based Universal Control System, $5^{th}$ Intl. Conf. on FACTORY 2000, Apr. 2-4, 1997, Conf. Pub. No. 435, pp. 284-287.

Paul Virgo, Embedded PC's for the Industrial Marketplace: An Analysis of the STD Bus, WESCON/'93. Conference Record, Sep. 28-30, 1993, pp. 621-623.

Jahn Luke et al., A commercial off-the-shelf based replacement strategy for aging avionics computers, Aerospace and Electronics Conference, 1998. NAECON 1998, Proceedings of the IEEE 1998 National, Jul. 13-17, 1998, pp. 177-181.

Get Control, Inc., PC-104 DIG-10-48 Plus, http://www.getcontrol.com downloaded from the internet on Mar. 20, 2003, p. 1.

D. Powell et al., GUARDS: a generic upgradeable architecture for real-time dependable systems, Parallel and Distributed Systems, IEEE Transactions on, vol. 10, Issue: 6, Jun. 1999, pp. 580-599.

Robert A. Burckle, PC/104 Embedded Modules: The New Systems Components, http://www.winsystems.com/papers/sys_components.pdf downloaded from the internet on Mar. 20, 2003, pp. 1-3.

WinSystems, http://www.webarchive.org/web/19881212034126/http://winsystems.com/ (Dec. 12, 1998), downloaded from the internet on Oct. 27, 2003, all pages.

RTD USA, http://www.webarchive.org.web/1990422091026/-http://rtdusa.com/ (Apr. 22, 1999), downloaded from the internet on Oct. 27, 2003, all pages.

WinSystems, www.winsystems.com downloaded from the internet on Apr. 2, 2003, pp. 1-25.

Robert A. Burckle, STD Bus: Performance without Complexity, http://www.winsystems.com/papers/stdperformance.pdf (Aug. 1, 2001), pp. 1-3.

Craig Matasumoto, Intel starts preaching about security, EE Times http://eetimes.com/story/OEG1990121S0014 (Jan. 21, 1999), pp. 1-4.

Office Action dated Jun. 15, 2004 in related U.S. Appl. No. 10/134,657.

PCT International Preliminary Examination Report dated Mar. 21, 2002 issued in PCT/US01/07381 4 pp.

U.S. Office Action dated Nov. 12, 2003 issued in U.S. Appl. No. 09/520,404.

U.S. Final Office Action dated May 13, 2004 issued in U.S. Appl. No. 09/520,404.

U.S. Advisory Action dated Aug. 5, 2004 issued in U.S. Appl. No. 09/520,404.

U.S. Notice of Allowance, Notice of Allowability, and Examiner's Amendment dated Apr. 22, 2005 issued in U.S. Appl. No. 09/520,404.

U.S. Notice of Allowance, Notice of Allowability, and Examiner's Amendment dated Sep. 19, 2005 issued in U.S. Appl. No. 09/520,404.

U.S. Office Action dated Jan. 27, 2006 issued in U.S. Appl. No. 10/182,534.

U.S. Notice of Allowance, Notice of Allowability, and Examiner's Amendment dated Aug. 21, 2006 issued in U.S. Appl. No. 10/182,534.

U.S. Notice of Allowance and Notice of Allowability dated Nov. 21, 2006 issued in U.S. Appl. No. 10/182,534.

U.S. Office Action dated Nov. 4, 2004 issued in U.S. Appl. No. 09/949,021.

U.S. Final Office Action dated Apr. 20, 2005 issued in U.S. Appl. No. 09/949,021.

U.S. Advisory Action dated Jul. 13, 2005 issued in U.S. Appl. No. 09/949,021.

U.S. Office Action dated Oct. 17, 2005 issued in U.S. Appl. No. 09/949,021.

U.S. Notice of Allowance, Notice of Allowability, and Interview Summary dated May 26, 2006 issued in U.S. Appl. No. 09/949,021.

* cited by examiner

ENCRYPTION IN A SECURE COMPUTERIZED GAMING SYSTEM

This application claims priority under U.S.C. 120 and is a continuation of U.S. application Ser. No. 09/949,021, filed Sep. 7, 2001, now U.S. Pat. No. 7,116,782 titled, "ENCRYPTION IN A SECURE COMPUTERIZED GAMING SYSTEM," which is incorporated herein in its entirety and for all purposes, which is a continuation-in-part of U.S. patent application Ser. No. 09/520,404, filed Mar. 8, 2000, now U.S. Pat. No. 7,043,641, and claims priority from PCT Application Ser. No. PCT/US01/07381, filed on Mar. 8, 2001. This application is also related to co-pending application Ser. No. 09/405,921, filed Sep. 24, 1999.

FIELD OF THE INVENTION

The invention relates generally to computerized wagering game systems, and more specifically to the use of encryption, code analysis, data analysis and hash functions to improve or ensure security and to provide authentication in a computerized wagering game system.

BACKGROUND OF THE INVENTION

Games of chance have been enjoyed by people for thousands of years and have enjoyed increased and widespread popularity in recent times. As with most forms of entertainment, players enjoy playing a wide variety of games and new games. Playing new games adds to the excitement of "gaming." As is well known in the art and as used herein, the term "gaming" and "gaming devices" are used to indicate that some form of wagering is involved, and that players must make wagers of value, whether actual currency or some equivalent of value, e.g., token or credit.

One popular game of chance is the slot machine. Conventionally, a slot machine is configured for a player to wager something of value, e.g., currency, house token, established credit or other representation of currency or credit. After the wager has been made, the player activates the slot machine to cause a random event to occur. The player wagers that particular random events will occur that will return value to the player. A standard device causes a plurality of reels to spin and ultimately stop, displaying a random combination of some form of indicia, for example, numbers or symbols. If this display contains one of a preselected plurality of winning combinations, the machine releases money into a payout chute or increments a credit meter by the amount won by the player. For example, if a player initially wagered two coins of a specific denomination and that player achieved a payout, that player may receive the same number or multiples of the wager amount in coins of the same denomination as wagered.

There are many different formats for generating the random display of events that can occur to determine payouts in wagering devices. The standard or original format was the use of three reels with symbols distributed over the face of the wheel. When the three reels were spun, they would eventually each stop in turn, displaying a combination of three symbols (e.g., with three wheels and the use of a single payout line as a row in the middle of the area where the symbols are displayed.) By appropriately distributing and varying the symbols on each of the reels, the random occurrence of predetermined winning combinations can be provided in mathematically predetermined probabilities. By clearly providing for specific probabilities for each of the preselected winning outcomes, precise odds that would control the amount of the payout for any particular combination and the percentage return on wagers for the house could be readily controlled.

Other formats of gaming apparatus that have developed in a progression from the pure slot machine with three reels have dramatically increased with the development of video gaming apparatus. Rather than have only mechanical elements such as wheels or reels that turn and stop to randomly display symbols, video gaming apparatus and the rapidly increasing sophistication in hardware and software have enabled an explosion of new and exciting gaming apparatus. The earlier video apparatus merely imitated or simulated the mechanical slot games in the belief that players would want to play only the same games. Early video games therefore were simulated slot machines. The use of video gaming apparatus to play new games such as draw poker and Keno broke the ground for the realization that there were many untapped formats for gaming apparatus. Now casinos may have hundreds of different types of gaming apparatus with an equal number of significant differences in play. The apparatus may vary from traditional three reel slot machines with a single payout line, video simulations of three reel video slot machines, to five reel, five column simulated slot machines with a choice of twenty or more distinct pay lines, including randomly placed lines, scatter pays, or single image payouts. In addition to the variation in formats for the play of games, bonus plays, bonus awards, and progressive jackpots have been introduced with great success. The bonuses may be associated with the play of games that are quite distinct from the play of the original game, such as the video display of a horse race with bets on the individual horses randomly assigned to players that qualify for a bonus, the spinning of a random wheel with fixed amounts of a bonus payout on the wheel (or simulation thereof), or attempting to select a random card that is of higher value than a card exposed on behalf of a virtual dealer.

Examples of such gaming apparatus with a distinct bonus feature includes U.S. Pat. Nos. 5,823,874; 5,848,932; 5,836,041; U.K. Patent Nos. 2 201 821 A; 2 202 984 A; and 2 072 395A; and German Patent DE 40 14 477 A1. Each of these patents differ in fairly subtle ways as to the manner in which the bonus round is played. British patent 2 201 821 A and DE 37 00 861 A1 describe a gaming apparatus in which after a winning outcome is first achieved in a reel-type gaming segment, a second segment is engaged to determine the amount of money or extra games awarded. The second segment gaming play involves a spinning wheel with awards listed thereon (e.g., the number of coins or number of extra plays) and a spinning arrow that will point to segments of the wheel with the values of the awards thereon. A player will press a stop button and the arrow will point to one of the values. The specification indicates both that there is a level of skill possibly involved in the stopping of the wheel and the arrow(s), and also that an associated computer operates the random selection of the rotatable numbers and determines the results in the additional winning game, which indicates some level of random selection in the second gaming segment, U.S. Pat. Nos. 5,823,874 and 5,848,932 describe a gaming device comprising: a first, standard gaming unit for displaying a randomly selected combination of indicia, said displayed indicia selected from the group consisting of reels, indicia of reels, indicia of playing cards, and combinations thereof; means for generating at least one signal corresponding to at least one select display of indicia by said first, standard gaming unit; means for providing at least one discernible indicia of a mechanical bonus indicator, said discernible indicia indicating at least one of a plurality of possible bonuses, wherein said providing means is operatively connected to said first, standard gaming unit and becomes actuatable in response to said signal. In effect, the second gaming event simulates a mechanical bonus indicator such as a roulette wheel or wheel with a pointing element.

A video terminal is another form of gaming device. Video terminals operate in the same manner as conventional slot or video machines except that a redemption ticket is issued rather than an immediate payout being dispensed.

The vast array of electronic video gaming apparatus that is commercially available is not standardized within the industry or necessarily even within the commercial line of apparatus available from a single manufacturer. One of the reasons for this lack of uniformity or standardization is the fact that the operating systems that have been used to date in the industry are primitive. As a result, the programmer must often create code for each and every function performed by each individual apparatus. To date, no manufacturer is known to have been successful in creating a universal operating system for converting existing equipment (that includes features such as reusable modules of code) at least in part because of the limitations in utility and compatibility of the operating systems in use. When new games are created, new hardware and software is typically created from the ground up.

At least one attempt has been made to create a universal gaming engine that segregates the code associated with random number generation and algorithms applied to the random number string from the balance of the code. Carlson U.S. Pat. No. 5,707,286 describes such a device. This patentee recognized that modular code would be beneficial, but only contemplated making the RNG and transfer algorithms modular.

The lack of a standard operating system has contributed to maintaining an artificially high price for the systems in the market. The use of unique hardware interfaces in the various manufactured video gaming systems is a contributing factor. The different hardware, the different access codes, the different pin couplings, the different harnesses for coupling of pins, the different functions provided from the various pins, and the other various and different configurations within the systems has prevented any standard from developing within the technical field. This is advantageous to the apparatus manufacturer, because the games for each system are provided exclusively by a single manufacturer, and the entire systems can be readily obsoleted, so that the market will have to purchase a complete unit rather than merely replacement software. Also, competitors cannot easily provide a single game that can be played on different hardware. A solution to this problem is presented in our co-pending application for Video Gaming Apparatus for Wagering with Universal Computerized Controller and I/O Interface for Unique Architecture, assigned Ser. No. 09/405,921, and filed Sep. 24, 1999, the disclosure that is incorporated herein by reference.

The invention of computerized gaming systems that include a common or universal video wagering game controller that can be installed in a broad range of video gaming apparatus without substantial modification to the game controller has made possible the standardization of many components and of corresponding gaming software within gaming systems. Such systems desirably will have functions and features that are specifically tailored to the unique demands of supporting a variety of games and gaming apparatus types, and will do so in a manner that is efficient, secure, and cost-effective.

In addition to making communication between a universal operating system and non-standard machine devices such as coin hoppers, monitors, bill validators and the like possible, it would be desirable to provide security features that enable the operating system to verify that game code and other data has not changed during operation.

Alcorn et al. U.S. Pat. No. 5,643,086 describes a gaming system that is capable of authenticating an application or game program stored on a mass media device such as a CD-ROM, RAM, ROM or other device using hashing and encryption techniques. The mass storage device may be located in the gaming machine, or may be external to the gaming machine. This verification technique therefore will not detect any changes that occur in the code that is executing because it tests the code residing in mass storage prior to loading into RAM. The authenticating system relies on the use of a digital signature and suggests hashing of the entire data set during the encryption and decryption process. See also, Alcorn et al. U.S. Pat. No. 6,106,396 and Alcorn et al. U.S. Pat. No. 6,149,522.

In particular, U.S. Pat. No. 6,149,522 describes a method for preparing a casino game data set for authentication that, in its broadest concept, requires a) providing a data set for a casino game, b) computing a primary abbreviated bit string that is unique to the data set, c) encrypting the unique abbreviated bit string data set to provide a signature, and d) storing the casino data set and the signature.

The patent also describes a method for authentication of a casino game data set that consists of a) decrypting the signature generated during the preparation of the game data set, b) computing a second abbreviated bit string from the data set and c) comparing the results.

What is desired by the present inventors is an architecture and method providing a gaming-specific platform that i) features secure storage and verification of game code and other data, ii) provides the ability to securely change game code on computerized wagering gaming system, and iii) has the ability to verify that the code has not changed during operation of the gaming machine.

It is further desired by the inventors that the game program code be identifiable as certified or approved, such as by the Nevada Gaming Regulations Commission or other regulatory agency.

SUMMARY OF THE INVENTION

The invention provides an architecture and method for a wagering game-specific platform that features secure storage, verification and authentication of game code and other data, provides the ability to securely exchange data with a computerized wagering gaming system, and does so in a manner that is straightforward and easy to manage. Some embodiments of the invention provide the ability to identify game program code as certified or approved, such as by the Nevada Gaming Regulations Commission or other regulatory agency. The invention provides these and other functions by use of various electronic elements for security, including digital signatures, encryption, hash functions and a special type of key-dependent one-way hash function known as a message authentication code. Such functions are advantageously applied to data loaded into RAM and occur while the gaming machine is in operation.

In one embodiment the present invention provides a method of preparing a game data set for authentication. The method starts by providing a game data set. A set of message authentication codes that are unique to the combination of the game data set and a randomly generated seed value is determined. The random seed value, the game data set handles, and the message authentication codes for the game data set are stored in a control file, which is itself encrypted for security and authentication purposes.

In another embodiment, the present invention provides a method of authenticating information, including a game data set and game and operational components used in a gaming system. The method includes receiving an encrypted control file and decrypting it to provide a control file. The control file includes a set of program handles such as file names, a set of message authentication codes including a message authentication code for each program file, and a random seed value that was used in creating the message authentication codes. The information in the control file is used to authenticate the individual files in the game data set, by re-computing any of the original message authentication codes for a given file and comparing the result to the contents of the control file. A game data set in the practice of the present invention must contain more than a single file, such as at least two and preferably all or a combination of at least three of video file, audio file, coin counting file, random number generation file, button recognition file, etc. as further described elsewhere herein and in the art. In another embodiment, the present invention provides a gaming system. The gaming system includes a nonvolatile memory. An encrypted control file is stored in the nonvolatile memory. The encrypted control file includes a set of program filenames, a message authentication code for each program file, and a random seed. A gaming controller is provided, wherein the gaming controller operates to decrypt the encrypted control file and authenticate the gaming program files during operation of the gaming system.

DETAILED DESCRIPTION OF THE INVENTION

Figure 1:
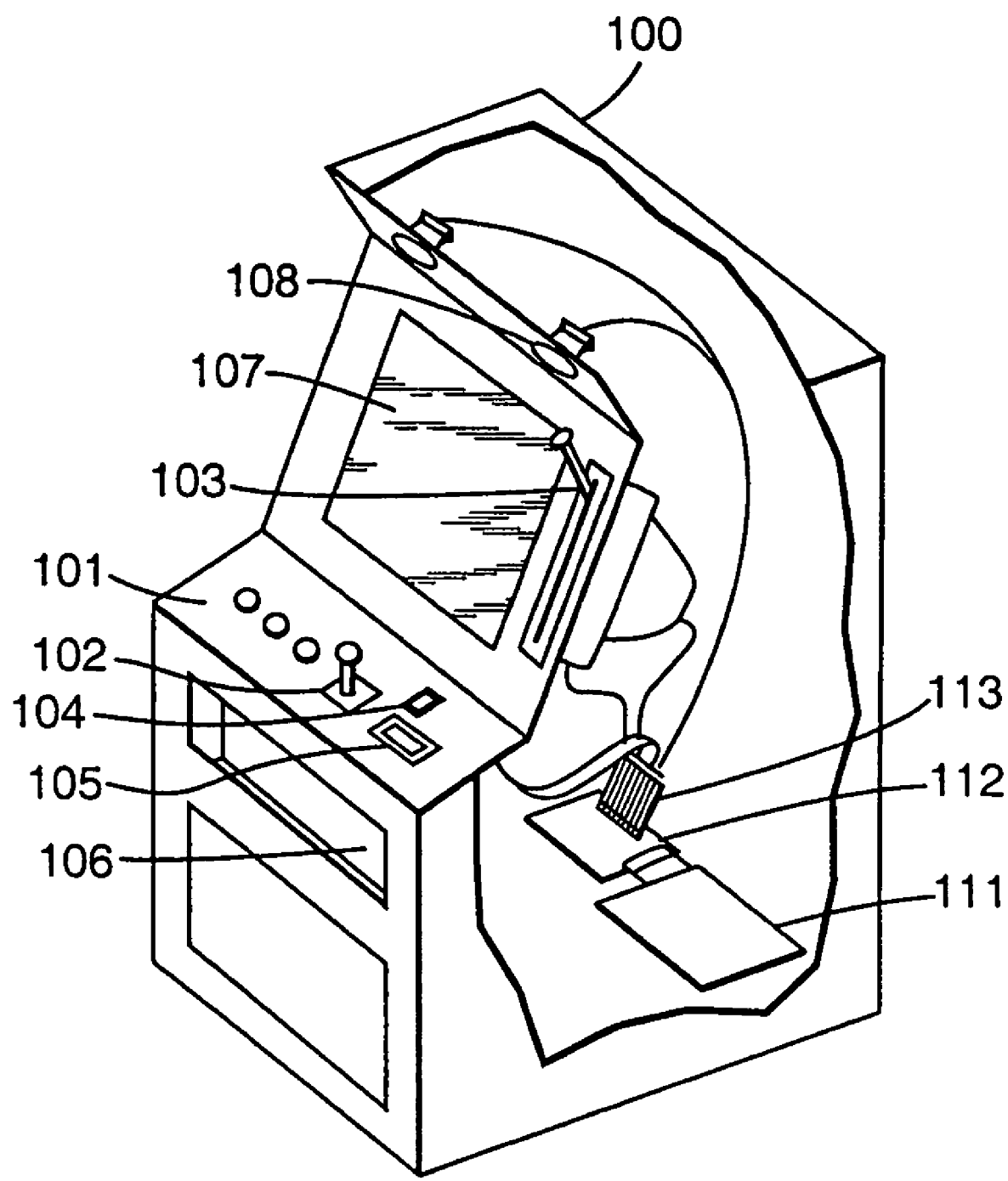
FIG. 1 shows a computerized wagering game apparatus such as may be used to practice some embodiments of the present invention.

In the following detailed description of embodiments of the invention, reference is made to the accompanying drawings which form a part hereof, and in which is shown by way of illustration specific sample embodiments in which the invention may be practiced. These embodiments are described in sufficient detail to enable those skilled in the art to practice the invention, and it is to be understood that other embodiments may be utilized and that logical, mechanical, electrical, and other changes may be made without departing from the spirit or scope of the present invention. The following detailed description is, therefore, not to be taken in a limiting sense, and the scope of the invention is defined only by the appended claims.

The present invention in various embodiments provides an architecture and method for a universal operating system that features secure storage and verification of game code, game data and other code and/or data, provides the ability to securely exchange data with a computerized wagering gaming system, and does so in a manner that is straightforward and easy to manage. Some embodiments of the invention provide the ability to identify game program code as certified or approved, such as by the Nevada Gaming Commission or other regulatory agency. The invention provides these and other functions by the use of encryption, hash functions and message authentication codes. Because hash functions and the other encryption methods are employed widely in the present invention, they are introduced and discussed here.

"Hash functions" for purposes of this disclosure are a type of function that generates a unique data string from a specific set of data, typically of fixed length, from variable strings of characters or text. The data string generated is typically substantially smaller than the text string itself, but is long enough that it is unlikely that the same number will be produced by the hash function from different strings of text (e.g., up to $2^{30}$ integers, $2^{60}$ integers, $2^{100}$ integers, $2^{160}$ integers or more). The formula employed in the hash function must also be chosen such that it is unlikely that different text strings will produce the same hash value. An example of a suitable hash function is a 160 bit SHA hash. Regardless of file size, the hash value will be 160 bits in length.

The hashed data string may be referred to as a "message digest." A message digest can be stored for future use, or encrypted and then stored in nonvolatile memory, for example.

Hash functions are often used to hash data records to produce unique numeric values corresponding to each data record in a database, which can then be applied to a search string to reproduce the hash value. The hash value can then be used as an index key, eliminating the need to search an entire database for the requested data. Some hash functions are known as one-way hash functions, meaning that with such a function it is extremely difficult to derive a text string that will produce a given hash value, but relatively easy to produce a hash value from a text string. This ensures that it is not feasible to modify the content of the text string and produce the same hash value.

Such a function can be used to hash a given character string and produce a first hash value that can later be compared to a second hash value derived from the same character string, to ensure the character string has not changed. If the character string has been altered, the hash values produced by the same hash function will be different. The integrity of the first hash value can be protected against alteration by use of encryption methods such as the use of a digital signature, or by using a specialized secure hash function known as a message authentication code. A message authentication code is a key-dependent one-way hash function. The principal difference between a standard one-way hash function and a message authentication code is that for any given character string, there can be many possible hash outcomes depending on the value of the key.

Digital signatures are employed to sign electronic documents or character strings, and ensure that the character string has not been altered since signing. Digital signatures typically are employed to indicate that a character string was intentionally signed with an unforgeable signature that is not reusable with another document, and that the signed document is unalterable. The digital signing mechanism or method is designed to meet these criteria, typically by using complex mathematical encryption techniques.

One example is use of a public key/private key encryption system to sign a document. In a public key/private key system, a user has a pair of keys, either of which may be used to encrypt or decrypt a document. The public key is published or distributed in a manner that reasonably ensures that the key in fact belongs to the key owner, and the private key is kept strictly secret. If someone wishes to send a character string that only a certain person may read, the character string is encrypted before sending using the intended reader's public key. The character string is then visible only by using the intended reader's private key to decrypt the character string.

However, if a user wishes to send a character string in such a manner that the document is virtually guaranteed to be the authentic document created by the sender but essentially anyone can read it, the user can sign the document by encrypting it with his private key before sending. Anyone can then decrypt the document with the signer's public key which is typically widely distributed, and can thereby verify that the character string was signed by the key pair owner. This example embodiment meets the requirements of a digital signature, ensuring that a character string was intentionally signed with an unforgeable signature that is not reusable with another document, and that the signed document has not been altered.

Because encryption of large character strings such as large computer programs or long text documents can require a substantial amount of time to encrypt and decrypt, some embodiments of digital signatures utilize one-way hash functions. In one such embodiment, the signer uses a known one-way hash algorithm to create a hash value for the character string, and encrypts the hash value with his private key. The document and signed hash value are then sent to the recipient, who a) runs the same hash function on the character string and b) compares the resulting hash value with the hash value produced by decrypting the signed hash value with the signer's public key. Such a method provides very good security, as long as the hash function and encryption algorithm employed are suitably strong.

Encryption of data via a public key/private key system is useful not only for producing digital signatures, but also for encryption of data before sending or storing the data or to keep data secure or secret in other applications. Similarly, symmetric encryption techniques which rely on encryption and decryption of the same single secret key may be applied to such applications. For example, transmission of program data between a network server and a computerized wagering game apparatus may be secured via a symmetric encryption technique, and the program data received in the game apparatus may be verified as approved by a regulatory agency via a digital signature employing hash functions and public key cryptography before execution.

Many encryption methods and formulas exist, which are usable consistent with the present invention. Some symmetric encryption methods, such as DES (Data Encryption Standard) and its variants rely on the secrecy of a single key, and so may not be adaptable to those specific methods described as a narrow practice within the generic scope of the present invention herein that require a key pair with a public key. A variety of other encryption methods, such as RSA and Diffie-Hellman are consistent with public/private key methods, and are usable in these methods. Various hash functions may also be employed, such as MD5 or SHA, and will be useful in many aspects consistent with the present invention so long as they are sufficiently nonreversible to be considered one-way hash functions. Various encryption methods will also provide varying degrees of security, from those that are relatively easy to defeat to those that are extremely difficult to defeat. These various degrees of security are to be considered within the scope of encryption methods consistent with this application, including various degrees of security that may to varying degrees of probability make encrypted data unforgeable, unreadable, or the like. A variety of encryption methods exist and are expected to be developed in the future, all of which are likely to be employable in some aspect consistent with the present invention, and are within the scope of the invention.

FIG. 1 shows an exemplary gaming system 100, illustrating a variety of components typically found in gaming systems and how they may be used in accordance with the present invention. User interface devices in this gaming system include push buttons 101, joystick 102, and pull arm 103. Credit for wagering may be established via coin or token slot 104, a device 105 such as a bill receiver or card reader, or any other credit input device. A card reader 105 may also provide the ability to record credit information on a user's card when the user has completed gaming, or credit may be returned via a coin tray 106 or other credit return device. Information is provided to the user by devices such as video screen 107, which may be a cathode ray tube (CRT), liquid crystal display (LCD) panel, plasma display, light-emitting diode (LED) display, or other display device that produces a visual image under control of the computerized game controller. Also, buttons 101 may be illuminated to indicate what buttons may be used to provide valid input to the game system at any point in the game. Still other lights or other visual indicators may be provided to indicate game information or for other purposes such as to attract the attention of prospective game users. Sound is provided via speakers 108, and also may be used to indicate game status, to attract prospective game users, or for other purposes, under the control of the computerized game controller.

The gaming system 100 further comprises a computerized game controller 111 and I/O interface 112, connected via a wiring harness 113. The universal game controller 111 need not have its software or hardware designed to conform to the interface requirements of various gaming system user interface assemblies, but can be designed once and can control various gaming systems via I/O interfaces 112 designed to properly interface an input and/or output of the universal computerized game controller to the interface assemblies found within the various gaming systems.

In some embodiments, the universal game controller 111 is a standard IBM Personal Computer-compatible (PC compatible) computer. Still other embodiments of a universal game controller comprise general purpose computer systems such as embedded controller boards or modular computer systems. Examples of such embodiments include a PC compatible computer with a PC/104 bus, which is an example of a modular computer system that features a compact size and low power consumption while retaining PC software and hardware compatibility. The universal game controller provides all functions necessary to implement a wide variety of games by loading various program code on the universal controller, thereby providing a common platform for game development and delivery to customers for use in a variety of gaming systems. Other universal computerized game controllers consistent with the present invention may include any general-purpose computers that are capable of supporting a variety of gaming system software, such as universal controllers optimized for cost effectiveness in gaming applications or that contain other special-purpose elements yet retain the ability to load and execute a variety of gaming software.

In yet other embodiments, the universal controller with security features can be used for other applications, including controlling networked in-line systems such as progressive controllers and player tracking systems. The invention can also be used for kiosk displays and creating picture in picture features on a video display.

The universal computerized game controller of some embodiments is a computer running an operating system with a gaming application-specific kernel such as a customized Linux kernel. In further embodiments, a system handler application layer of code executes within the kernel, further providing common game functionality to the programmer. The game program in such embodiments is therefore only a fraction of the total code, and relies on the system handler application layer and kernel to provide commonly used gaming functions. Still other embodiments will have various levels of application code, ranging from embodiments containing several layers of game-specific code to a single-layer of game software running without an operating system or kernel but providing its own computer system management capability.

Figure 2:
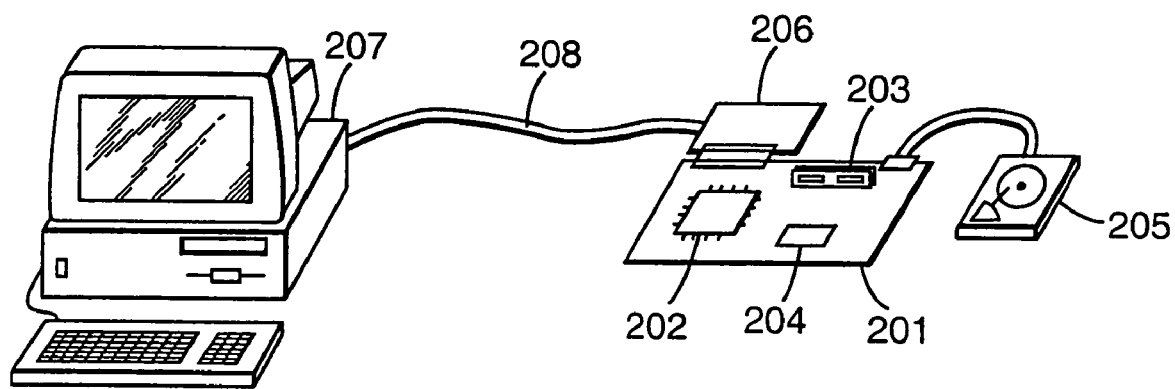
FIG. 2 shows a diagram of a networked computer connected to certain components comprising a portion of a computerized wagering game apparatus, consistent with some embodiments of the present invention.

FIG. 2 illustrates a networked computer connected to selected items that comprise a part of a computerized wagering game apparatus, as are used in various embodiments of the present invention. The computerized game controller 201 has a processor 202, memory 203, and nonvolatile memory 204. One example of nonvolatile memory is a flash disk on chip (hereinafter "flash disk"). The flash disk is advantageously read/write, yet retains information stored on disk upon power down. Attached to the computerized game controller of some embodiments is a mass storage device 205, and a network interface adaptor 206. The network interface adaptor is attached to a networked computer 207 via network connection 208. The various components of FIG. 2 exist within embodiments of the invention, and are illustrated to show the manner in which the various components are associated.

The computerized wagering game controller of the invention is operable to control a computerized wagering game, and is operable to employ encryption in various embodiments to provide data security. The computerized game controller 201 in some embodiments is a general-purpose computer, such as an IBM PC-compatible computer. The game controller executes an operating system, such as Linux or Microsoft Windows, which in further embodiments is modified to execute within the computerized gaming apparatus. The computerized game controller also executes game code, which may be loaded into memory 203 from either a mass storage device 205 such as a hard disc drive, or nonvolatile memory 204 such as flash memory or EPROM memory before execution. In some embodiments, the computerized game controller 201 loads encryption functions into memory 203, and those functions are subsequently executed to securely load other gaming system data from the mass storage device 205.

In further embodiments, the computerized game controller exchanges data with a networked computer 207 via a network connection 208 and a network interface adapter 206. Data exchanged via the network connection is encrypted in some embodiments of the invention, to ensure security of the exchanged data. The data to be exchanged in various embodiments comprises game program data, computerized gaming apparatus report data, data comprising commands to control the operation of the computerized gaming apparatus, and other computerized gaming apparatus data. Employing encryption in exchanging such data provides a degree of security, ensuring that such data is not altered or forged.

The invention employs encryption, including hash functions, symmetric encryption, and public key/private key encryption in various embodiments, which provides a degree of confidence that data utilized by the computerized gaming system and protected by encryption in accordance with the invention is not altered or forged. The data within the scope of the invention includes but is not limited to data comprising programs such as operating system or game program data, computerized gaming machine status data such as credits or other game state data, control instruction data for controlling the operation of the computerized gaming apparatus, and other computerized gaming machine data.

One embodiment of the invention comprises the use of hash functions to calculate a reference hash value for selected data, which can later be compared to a hash value calculated from the same data or a copy of the data to ensure the data has not been altered. The hash functions employed will desirably be one-way hash functions, to provide a greater degree of certainty that the reference hash value cannot be used in reverse to produce corresponding altered data. In a further embodiment, the data is hashed repeatedly by a continuously executing program thread that ensures that the data is not altered during the course of operation of the computerized wagering game. The data that is continuously hashed is in some embodiments is continuously hashed after being loaded into memory 203 for use by the computerized game controller.

If the reference hash value and the calculated hash value do not match, the computerized gaming apparatus will desirably provide some indication of the hash failure. In one embodiment, the game is brought to a locked or "tilt" state that prevents wagering upon a hash check failure. In a further embodiment, notification of the hash failure is sent to a networked computer 207 to alert the computer's user of the hash failure. In some embodiments, the computerized wagering game apparatus provides limited function to check the status of the game, including in further embodiments functions accessible only by operating controls within the computerized wagering game apparatus secure housing.

In one embodiment, the operating system as described in copending application for Computerized Gaming System, Method and Apparatus, having Ser. No. 09/520,405 and filed on the Mar. 8, 2000, cooperates with a library of "shared objects" that are specific to the game application. For purposes of this disclosure, a "shared object" is defined as self-contained, functional units of game code that define a particular feature set or sequence of operation for a game. The personality and behavior of a gaming machine of the present invention are defined by the particular set of shared objects called and executed by the operating system. Within a single game, numerous shared objects may be dynamically loaded and executed. This definition is in contrast with the conventional meaning of a shared object, which typically provides an API to multiple programs. An API is an Application Programming Interface, and includes a library of functions.

Figure 3:
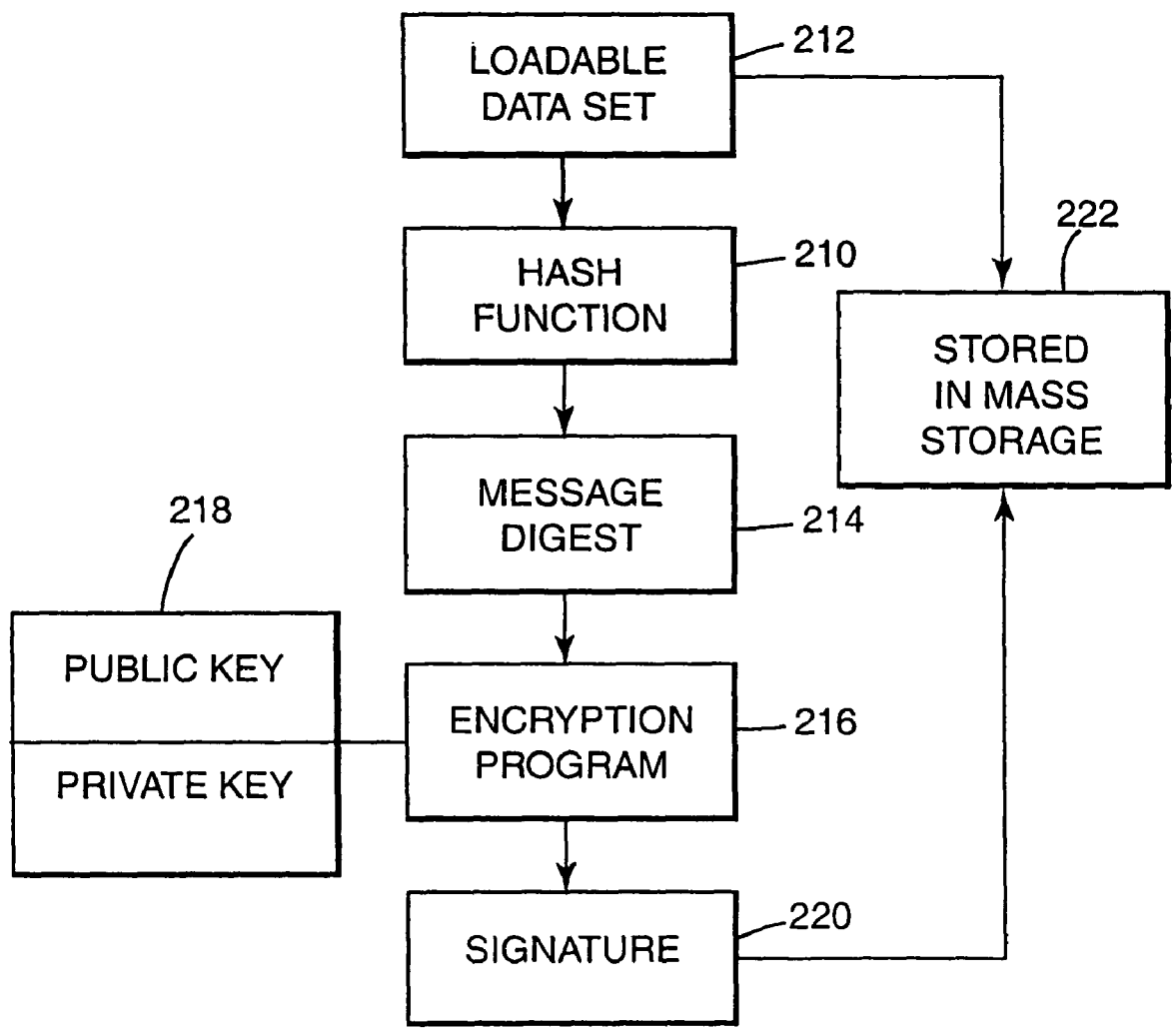
FIG. 3 is a diagram of a process of creating a signature for a loadable data set, utilizing a public/private key algorithm.
Figure 4:
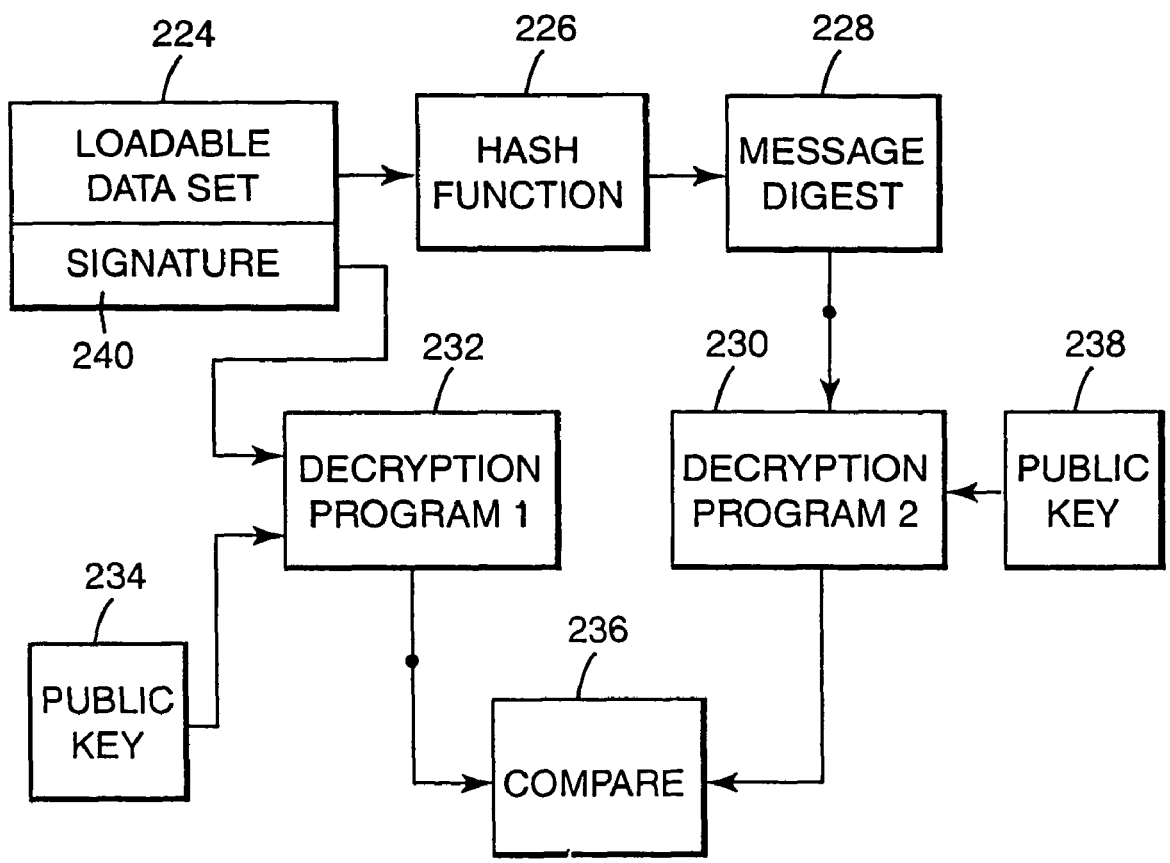
FIG. 4 is a diagram of a process for verifying a loadable data set has not changed during operation of the gaming device.

The shared object code, as well as other data may be verified according to one embodiment of the present invention by first preparing a signature from data, as shown in FIG. 3. The signature may be prepared by first hashing 210 the data set 212 to create a message digest 214. The message digest is encrypted via an encryption program utilizing a private/public key algorithm 218, forming a unique signature 220. The data and signature are then stored on a mass storage device 222 such as a network storage device, hard drive, CD-ROM, RAM, flash disk or the like.

In one embodiment, the shared objects for a particular application and their corresponding signatures are stored 224 in flash memory. When the shared objects are called, it is copied into RAM, where it is hashed 226 on a frequent periodic basis. The shared objects may be hashed from flash memory, or loaded into RAM and then hashed from RAM. Utilizing a Linux, Unix or other similar operating system advantageously permits the location of data in RAM. Data verification in RAM has the distinct advantage that errors will be caught at the time they occur, rather than when the data is loaded or reloaded. This could save casinos untold amounts by avoiding the payment of jackpots and the like based on machine malfunction. Since hashing is a batch process, the process is not continuous. However, when the hashing takes relatively little time, such as 10 seconds for example, the process can repeat itself so that the data verification in RAM is in effect, continuous.

To verify the message digest 228 a two-step process is used. A public key 234 is used by a first decryption program 232 to obtain an intermediate result. A public key 238 is used to decrypt the message digest utilizing a second, different decryption program 230. The values obtained by the first decryption program 232 and the second decryption program 230 are then compared 236. In some embodiments the public key 234 and the public key 238 may be the same value.

Although code verification of the gaming program shared objects has been described in detail above, code verification utilizing hash functions and signatures can be applied to verifying the authenticity of the linux kernel, modular modifications to the kernel, the operating system, game state data, random number generation data and the like. As added security, the present invention contemplates zeroing out all unused RAM to verify that no data in the form of code or other data was intentionally or unintentionally inserted.

In various embodiments, selected data is protected with encryption by encrypting the data to ensure the secrecy and integrity of the data. In some embodiments, the encryption process comprises encrypting the selected data with a private key such that the data can only be decrypted by using the corresponding public key. Because the private key is secret and documents encrypted with other private keys cannot be decrypted with the public key, successful decryption of data with the correct public key provides a degree of certainty that the data was encrypted by the intended preparer.

But, because public key/private key encryption algorithms typically take a relatively long time to encrypt large amounts of data, the encryption algorithm is more efficiently used in some embodiments to encrypt a unique characteristic of the data such as the hash value from a one-way hash function. In such an embodiment, the signer derives the reference hash value with a one-way hash function for the data to be signed, and encrypts the resulting hash value with his public key. One-way hash functions typically may be applied to data much more quickly than public key/private key algorithms, and so it is more desirable to process the entire data to be signed with a hash function than with a public key/private key algorithm. In some embodiments of the invention, only the hash value needs to be encrypted with public key/private key encryption, greatly reducing the time needed to sign or verify large amounts of data. To verify the signature, the hash value is decrypted with the intended signer's public key and the decrypted reference hash value is compared to a newly-computed hash value of the same data. If the reference hash value matches the newly-computed hash value, a degree of certainty exists that the signed data has not been altered since it was signed.

In some embodiments using digital signatures, the private key is that of a regulatory agency or other organization responsible for ensuring the integrity of data in computerized wagering game systems. For example, the Nevada Gaming Regulations Commission may sign data used in such gaming systems, ensuring that they have approved the signed data. Such an embodiment will be useful to ensure that game code executing in these systems has been approved and not altered since approval, and provides security both to the game operator or owner and to the regulatory commission. In other embodiments, the private key which is used is that of the game code manufacturer or designer, and ensures that the game code has not been altered from its original state since signing.

Secure storage of the reference hash values or public keys in the systems described above is important, because data can be more easily forged if the reference hash values or public keys used to verify the integrity of the data can also be altered. For this reason, the reference hash values, public keys, or other encryption key data is stored in nonvolatile memory 204. In some embodiments, the nonvolatile memory 204 is a flash memory or EPROM that is programmable, but is not readily altered by a user of the computerized wagering game apparatus. The nonvolatile memory in such embodiments is reprogrammable, but reprogramming requires in various embodiments the use of special hardware, execution of restricted functions, or other secure methods. In other embodiments, the nonvolatile memory 204 is a programmable memory that is not alterable, requiring replacement of the nonvolatile memory each time new encryption key data is needed. Such embodiments have the advantage that the nonvolatile memory 204 must be physically removed and replaced to alter the data, providing a degree of access security and allowing visual verification of the identity of the nonvolatile memory and its contents.

In still other embodiments, the encryption key data is stored on the mass storage device. Further embodiments include storage of the encryption key data embedded in encryption functions, storage in secure areas of a hard disc drive mass storage device, or use of other security methods to protect the encryption key data.

These encryption methods in some embodiments of the invention are also applied to computerized gaming system communication over a network. Data communicated over a network is in various embodiments of the invention verified by use of a hash function, verified by use of public key/private key encryption, verified by use of symmetric encryption, or verified by use of digital signatures. Also, a variety of key exchange or key negotiation protocols exist which in some embodiments of the invention provide the capability for a networked computerized gaming system to publicly agree with another networked computer system on encryption keys that may be subsequently used to communicate securely over a network.

Such network communication methods are utilized in the invention to provide for secure exchange of data between computerized wagering game systems and other networked computer systems. For example, control commands that control certain aspects of the operation of the computerized wagering games are securely sent over a network in some embodiments of the invention. Such commands may include increasing odds of payout on selected computerized wagering game systems, or changing the game program that is executed on selected computerized wagering game systems at selected times of the day. The computerized wagering games in some embodiments securely report game data such as bookkeeping data to a networked computer 207 via encryption. In still other embodiments of the invention, wagering game program data is securely transmitted over the network to the computerized wagering game systems, providing a secure way to provide new wagering games to the systems without physically accessing each computerized wagering game system. Various embodiments of the invention transmit other computerized wagering game data over a network connection via encryption, and are within the scope of the invention.

Because encryption methods typically provide a degree of security that is dependent on the effort and expense a hacker is willing to invest in defeating the encryption, replacement of encryption keys is employed in some embodiments of the invention. Digital signatures in some embodiments are valid only for a predetermined period of time, and in further embodiments have an associated date of expiry after which they may no longer be used. Such methods can also be used in various embodiments of it the invention to license games for use for a certain period of time, after which they will not be properly verified due to expiry of the encryption keys used for data verification. Because hash functions typically produce hash values that are dependent entirely on the data being hashed, embodiments of the invention which incorporate expiry and replacement of reference hash values also require reissuance of modified data to produce a different hash value. For example, minor bug fixes, addition of new features, or any other small change in the data comprising a gaming program will be sufficient to produce a different reference hash value upon hashing the edited program data, resulting in an updated reference hash value corresponding to the updated data.

Other embodiments use a variety of keys among various computerized wagering games and game producers, reducing the risk and therefore the value of successfully defeating an encryption key. For example, a game producer in one embodiment employs a different digital signature for each customer of its computerized wagering games, ensuring that defeating the encryption key on a single game system affects a limited number of games. In another embodiment, a regulatory agency may change keys with which it signs games on a periodic basis, so that a successful breach of security of the keys used to sign the data results in potential compromise of only a limited and identifiable number of games. It will be obvious to one skilled in the art that many variations on key replacement and expiry policies exist, all of which are considered within the scope of the present invention.

The invention provides an architecture and method for a gaming-specific platform that features secure storage and verification of game code and other data, provides the ability to securely exchange data with a computerized wagering gaming system, and does so in a manner that is straightforward and easy to manage. Some embodiments of the invention provide the ability to identify game program code as certified or approved, such as by the Nevada Gaming Regulations Commission or other regulatory agency. The invention provides these and other functions by use of encryption, including digital signatures and hash functions as well as other encryption methods.

Figure 5:
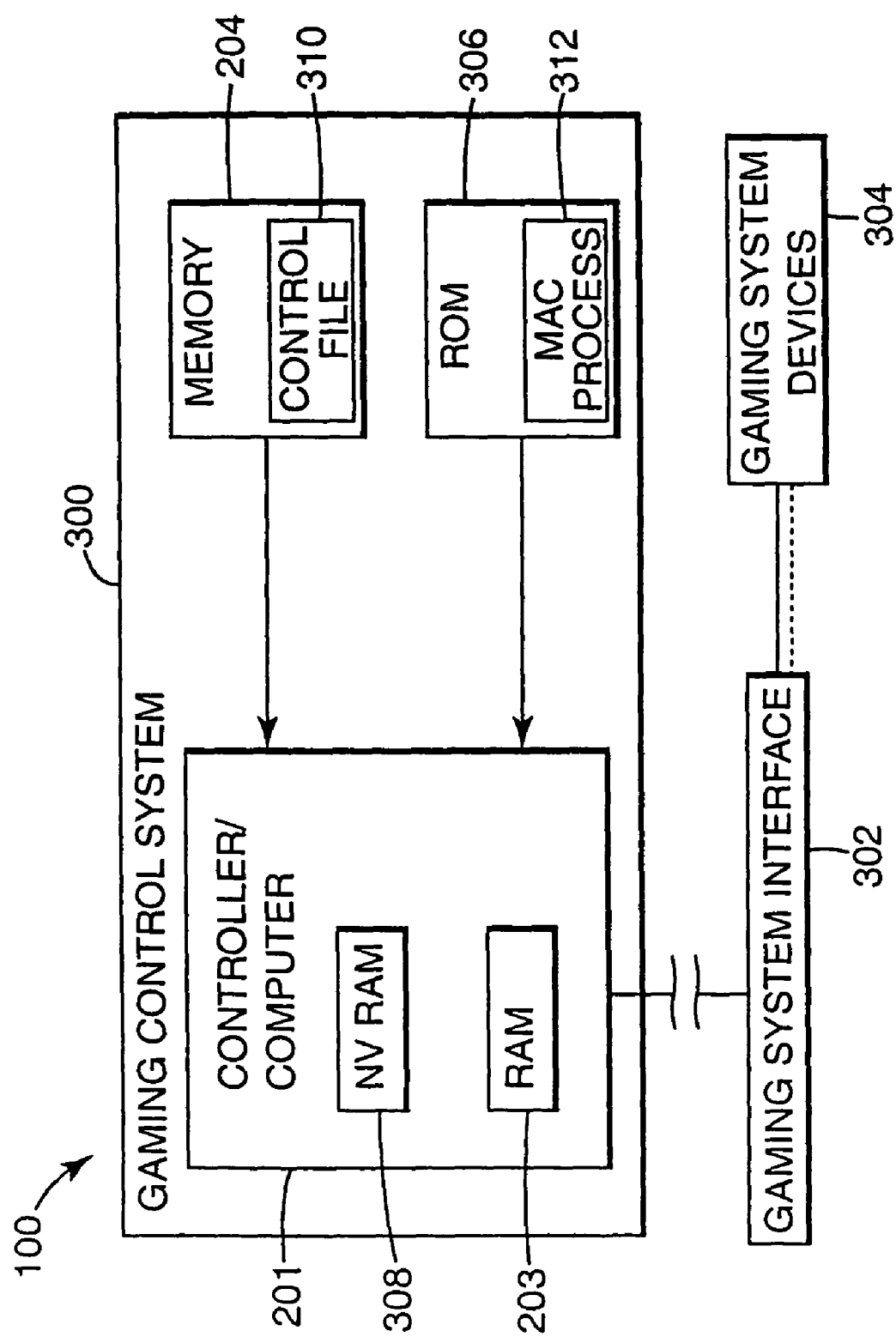
FIG. 5 is a block diagram illustrating one exemplary embodiment of a gaming system according to the present invention.

FIG. 5 is a block diagram illustrating one exemplary embodiment of a gaming system according to the present invention. The gaming system block diagram is representative of gaming system 100 shown in FIG. 1 and FIG. 2, and previously described herein. The gaming system 100 includes a unique system and method for preparing a game data set capable of authentication and authenticating a game used in the gaming system 100. The gaming system 100 includes a process which securely verifies that the gaming data set, including program files, have not been altered, either intentionally or unintentionally, changing the outcome of a game played on the gaming system 100.

Components of the present invention can be implemented in hardware via a microprocessor, programmable logic, or state machine, in firmware, or in software within a given device. In one preferred embodiment, one or more components of the present invention reside in software. Components of the present invention may also reside in software on one or more computer-readable mediums. The term computer-readable medium as used herein is defined to include any kind of memory, volatile or nonvolatile, such as floppy disks, hard disks, CD-ROMs, flash memory, read-only memory (ROM), and random access memory (RAM). In addition, gaming system 100 can employ a microprocessor embedded system/appliance incorporating tailored appliance hardware and/or dedicated signal purpose hardware.

In one aspect, gaming system 100 includes a gaming control system 300, gaming system interface 302, and gaming system devices 304. Gaming control system 300 includes computer or controller 201, nonvolatile memory 204, and nonvolatile memory 306. Controller 201 includes memory 203 and nonvolatile RAM (NVRAM) 308. In one aspect, memory 203 is random access memory. In one aspect, the random access memory 203 is dynamic random access memory (DRAM). The nonvolatile random access memory includes a battery backup for maintaining data stored in memory upon loss of power. In one embodiment, NVRAM 308 is used for storing crucial gaming data, such as slot machine reel settings, payoff percentages, and credits.

In one embodiment, program memory 204 is a read/writeable, nonvolatile memory. In one aspect, the writeable memory 204 is flash memory. One suitable nonvolatile memory is commercially available under the trade name "Disk on a Chip" commercially available from M Systems. Other nonvolatile memory suitable for use with the present invention, such as Compact Flash, will become apparent to one skilled in the art after reading the present application.

Nonvolatile memory 204 is used to store a game data set, which is defined to include game specific code or gaming program files. Exemplary game specific codes includes game code, game data, game sound, game graphics, game configuration files, or other game specific files. The game specific code or program files are directed to specific type of games run on the gaming system, such as Blackjack, poker, video slot machines, or reel slot machines. In one embodiment, nonvolatile memory 306 is read only memory (ROM) such as an EEPROM. Nonvolatile memory 306 is used to store gaming system operating code. Upon power up or operation of the gaming system, the gaming system operating code and game data sets are transferred into memory, preferably volatile memory 203, for fast access by controller 201 for operation of the gaming system. During operation of the gaming system 100, controller 201 interfaces with gaming system devices 304 via gaming system 302 for operation of the gaming system 100. Gaming system interface 302 may include network interface 206, network computer 207, and network connection 208 previously detailed herein. Gaming system devices 304 include mechanical, electrical, hardware, software or video devices, such as pushbuttons 101, joystick 102, pull arm 103, token or slot 104, device 105, point tray 106, video screen 107 and speakers 108 previously detailed herein.

The gaming system 100 according to the present invention includes an encrypted control file 310 and associated game files stored in the nonvolatile memory 204. The encrypted control file 310 includes the program filenames, message authentication codes for each program file, and a random seed. A message authentication code process 312 is stored in nonvolatile memory 306. The control file 310 is encrypted to keep the contents secret. The control file 310 is used in connection with the message authentication code process 312 to provide game data security during operation of the gaming system 100, as part of a game authentication/verification process. The game authentication/verification process is described in detail in reference to the following FIGS. 6-11.

Figure 6:
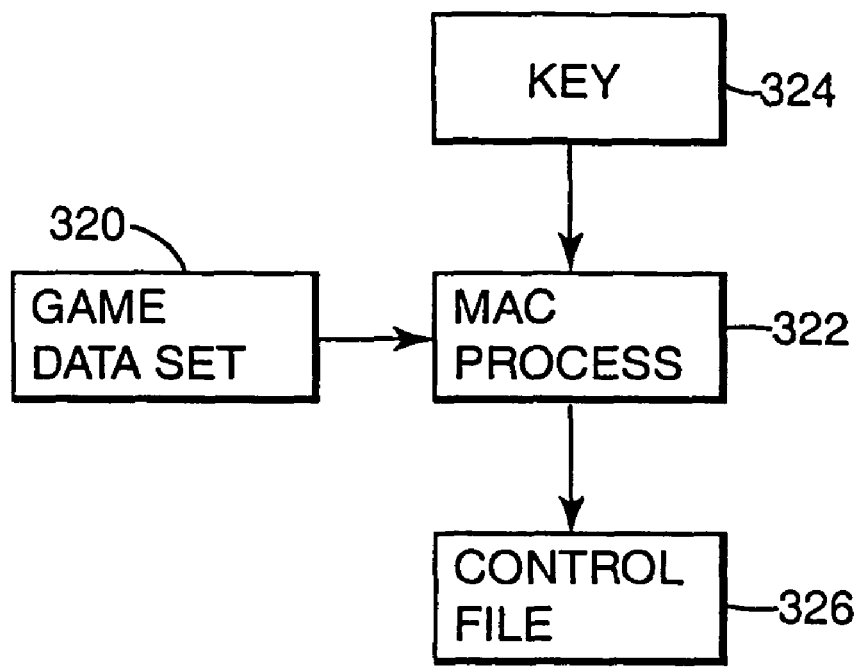
FIG. 6 is a diagram illustrating one exemplary embodiment of a process for preparing a game data set for authentication according to the present invention. The step of encrypting a control file and using a random key 324 is shown as random seed 324.
Figure 7:
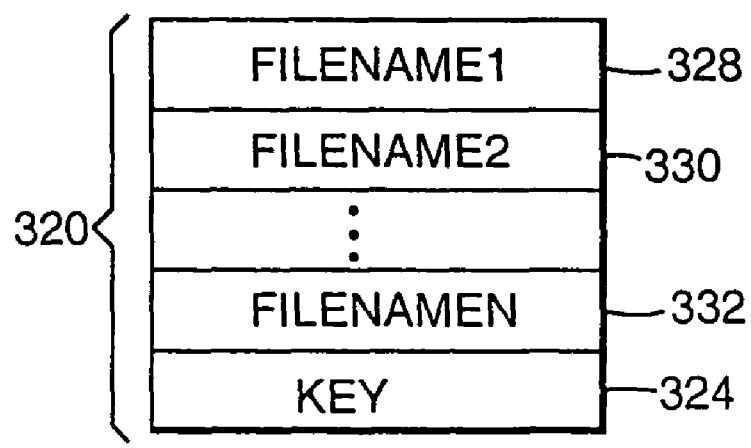
FIG. 7 is a diagram illustrating one exemplary embodiment of a game data set and key used in a gaming system according to the present invention.

FIG. 6 is a diagram illustrating one exemplary embodiment of a method of preparing a game data set for authentication. The game data set 320 includes game files, such as game code, game data, game sound, game graphics, game configuration files, and other game specific files. A message authentication code is determined for each file in the game data set 320. The set of message authentication codes are determined using a message authentication code process 322 (MAC process). In one aspect, the message authentication codes are determined using the filenames associated with the program files, resulting in fast determination of the unique message authentication codes. The output of the message authentication code process 322 is stored. In one aspect, the game data set, the message authentication code, and the message authentication code key are stored in a control file 326 in memory. The method authentication code process may be and is preferably started by random selection or random generation of an initial seed value 324. In this manner, the process operates to provide an encrypted control file 327 with the random seed value embedded in the encrypted compiled file. The presence of a random seed value embedded in the control file means that the individual message authentication codes which are generated during the MAC process 322 cannot be regenerated without first obtaining this key from the control file. FIG. 7 is a diagram illustrating one exemplary embodiment of game data set 320 and message authentication code key 324. In one aspect, game data set 320 includes a plurality of game specific code or program files, indicated as FILE 1 328, FILE 2 330, through FILE N 332.

Figure 8:
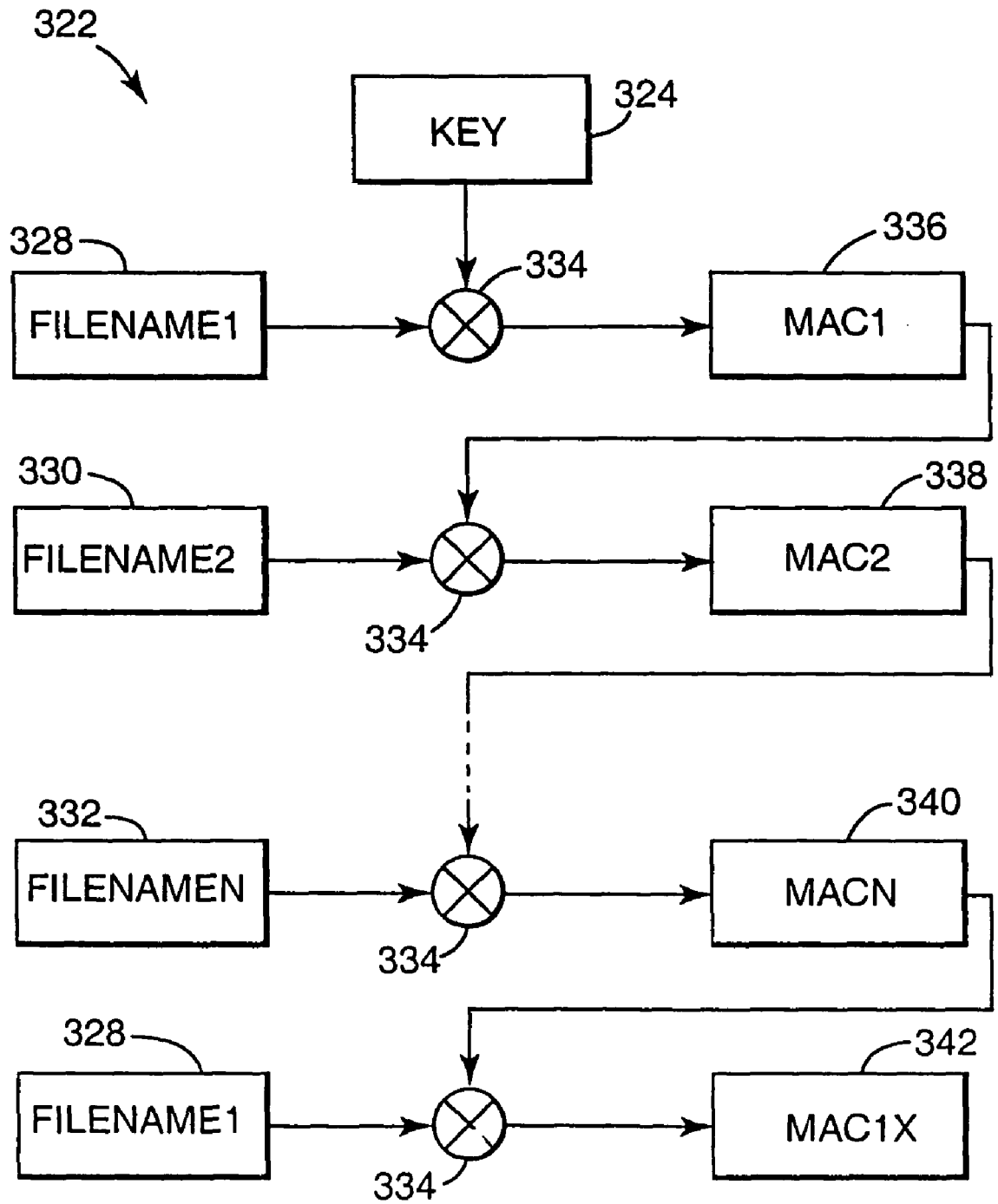
FIG. 8 is a diagram illustrating one exemplary embodiment of a message authentication code process used in a gaming system according to the present invention.

FIG. 8 is a diagram illustrating one exemplary embodiment of a message authentication code process 322 used in the present invention, including being used in preparing a game data set capable of authentication for a gaming system according to the present invention. In this embodiment, the message authentication code process utilizes a message authentication code function in a block chaining mode. Game data set 320 includes program files FILE 1 328, FILE 2 330 through FILE N 332. A message authentication code is determined for each program file FILE 1 328, FILE 2 330 through FILE N 332. A message authentication code function 334 is defined for the message authentication code process 322. Program FILE 1 328 and message authentication code random seed 324 are applied to the message authentication code function to determine message authentication code MAC1 336. Utilizing a block chaining scheme, the message authentication code MAC1 336 is used as the "key" for determining the next message authentication code for the next file. As such, the validity of the message authentication code process 322 is also dependent on the order in which the message authentication codes are determined, and the validity of the message authentication code output from each previous step.

Program FILE 2 330 and the message authentication code MAC1 336 are applied to message authentication code function 334 to determine message authentication code MAC2 338. This process is continued for each subsequent program file. As such, program FILE N 332 and the last determined message authentication code are applied to message authentication code function 334 to determine the message authentication code MAC N 340.

For increased security, a message authentication code is again determined for the program file FILE 1 328 utilizing the last determined message authentication code for the input key. FILE 1 328 and message authentication code MAC N 340 are applied to message authentication code function 334 to provide a message authentication code MAC 1X or (MAC 1' 342). In this embodiment, each message authentication code is derived in combination with information previously derived from other files as that authentication code is then dependent upon a previously determined message authentication code. The entire set of message authentication codes is therefore fundamentally dependent on the value chosen for the random seed 324.

Figure 9:
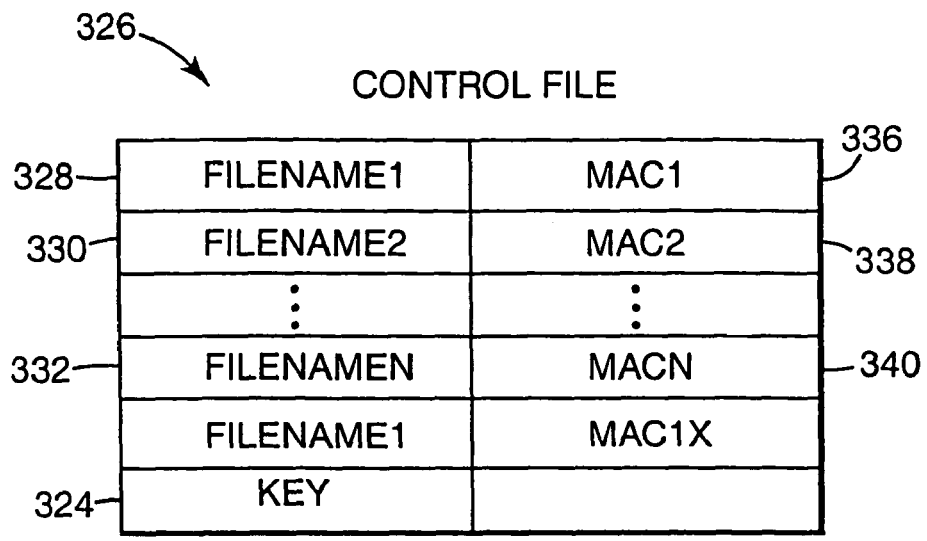
FIG. 9 is a diagram illustrating one exemplary embodiment of a control file used in a gaming system according to the present invention.
Figure 10:
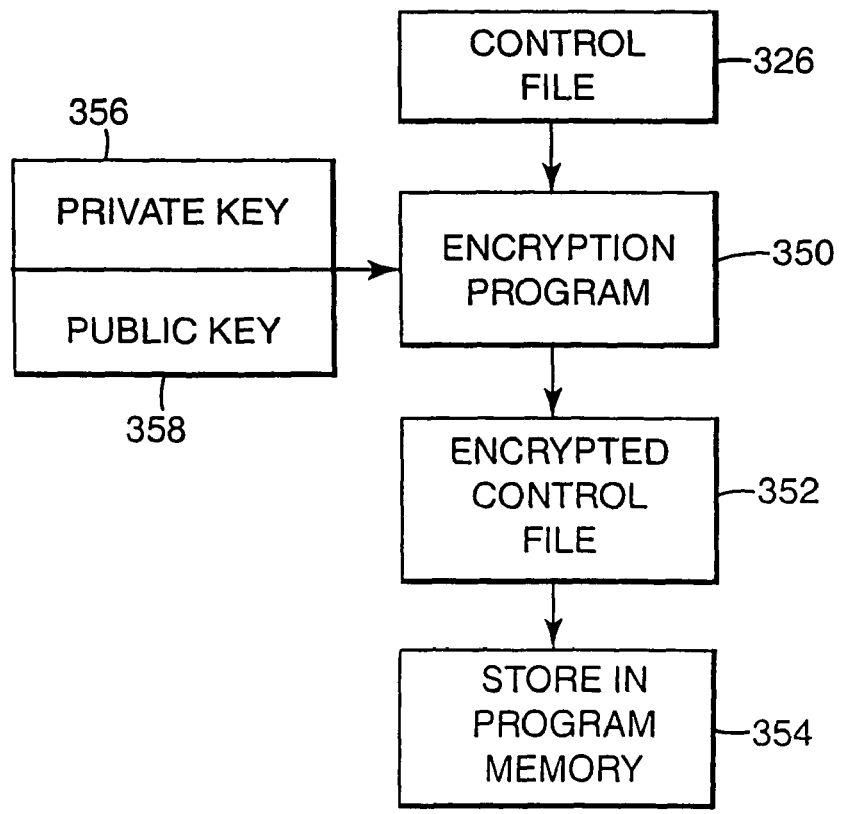
FIG. 10 is a diagram illustrating one exemplary embodiment of a process for encrypting a control file for use in a gaming system according to the present invention.

FIG. 9 is a diagram illustrating one exemplary embodiment of control file 326 generated after completion of the message authentication code process 322, where the encrypted control file is formed. Control file 326 includes each program filename in the game data set 320, including FILENAME1 328, program FILENAME2 330 through program FILENAMEN 332. Control file 326 also includes the random seed 324, and the message authentication code which was generated for each program file. FIG. 10 is a block diagram illustrating one exemplary embodiment of a process for providing a secure gaming system according to the present invention. In one aspect, control file 326 is encrypted using encryption program 350, to provide an encrypted control file 352. The encrypted control file 352 is stored in program memory, indicated at 354. In reference also to FIG. 5, the encrypted control file is shown stored in nonvolatile memory 204 as control file 310 for use by gaming system 100. Additionally, the program files associated with the encrypted control file are also stored in memory 204.

Figure 11:
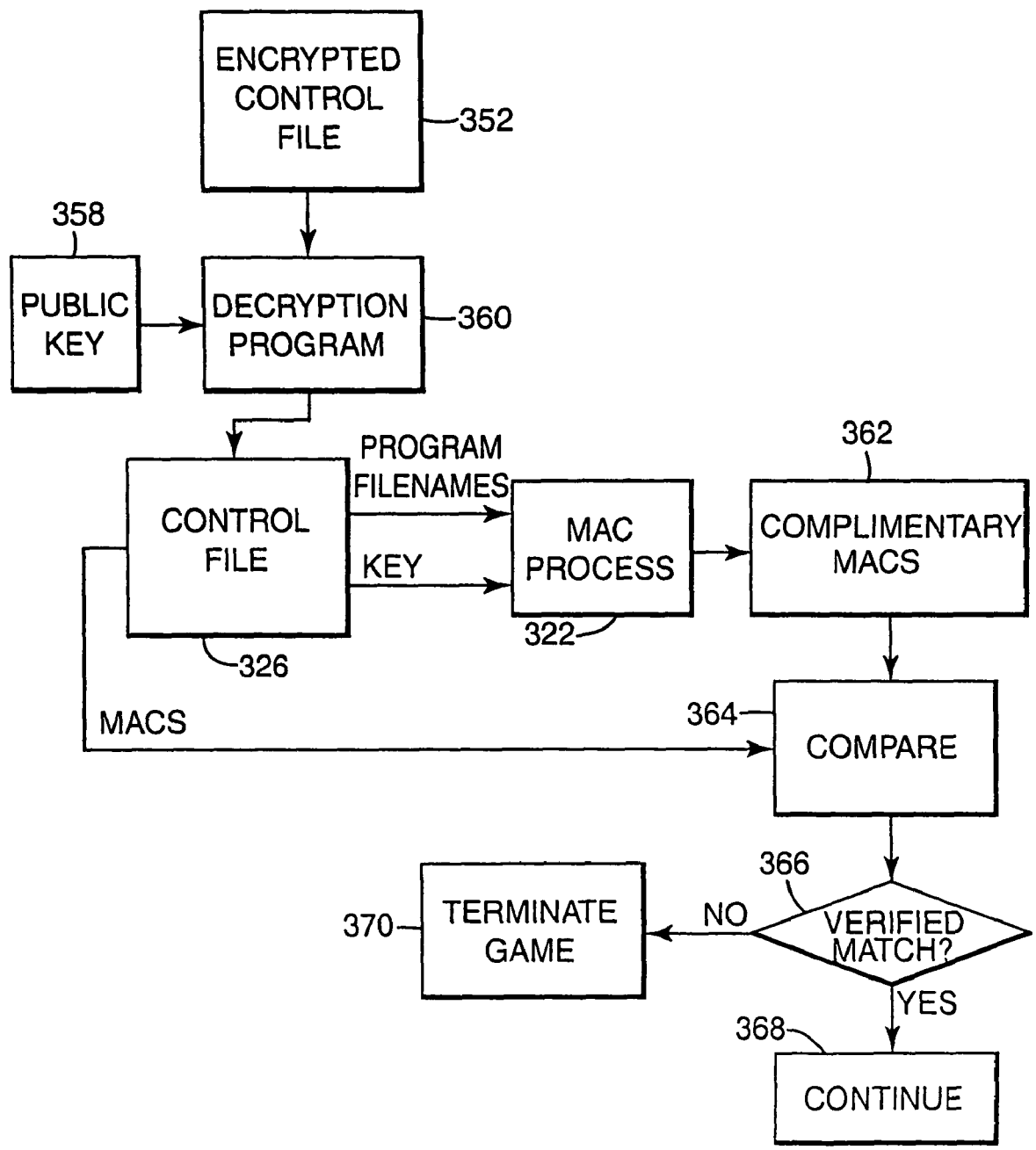
FIG. 11 is a diagram illustrating one exemplary embodiment of a process for authenticating a game used in a gaming system according to the present invention.

In one aspect, encryption program 350 utilizes a private key 356 and a public key 358 as part of a public key/private key encryption process similar to the public key/private key encryption process previously described herein. One encryption process suitable for use as encryption program 350 in the present invention utilizes an ElGamal encryption scheme. Other encryption methods may be utilized which may or may not use public key/private key encryption systems, such as RSA and Diffie-Hellman, may be employed. FIG. 11 is a diagram illustrating one exemplary embodiment of a method of authenticating a game used in a gaming system 100 according to the present invention. Reference is also made to FIGS. 1-10 previously detailed herein. The game can be verified as authentic at selected times (including regular or periodic times, to an extent that approaches continual authentication), such as during game power-up, or when game data, including game program files, is transferred from nonvolatile memory 204 for use by the gaming system 100. Further, once transferred into RAM 203, the authentication of the game data set or game program files can be checked at (continuously or at desired intervals) during operation of the game to verify authentication of the game.

In one aspect, encrypted control file 352 is received from nonvolatile memory 204 and decrypted using a corresponding decryption program 360. In one aspect, decryption program 360 utilizes public key 358. The decryption program 360 reverses the encryption provided by encryption program 350. The application of decryption program 360 to encrypted control file 352 results in the original control file 326. Control file 326 includes program filenames FILENAME 1, FILENAME 2 through FILENAMEN. Control file 326 further includes the corresponding unique message authentication codes MAC1, MAC2 through MACN, and MAC1X and the random seed value 324.

The game program files are compared with the previously determined message authentication codes in order to verify authenticity of the game and in particular the game programs. The program files and message authentication code key are applied in the same order described in the control file to the same message authentication code process 322, as previously detailed in FIG. 8, providing an output of complementary message authentication codes 362. At 364, the message authentication codes from control file 326 are compared to the corresponding determined complementary message authentication codes 362. As indicated at 366, if the message authentication codes and the complementary message authentication codes match, the game is verified authentic and use of the game programs is allowed to continue, indicated at 368. If the message authentication codes and the complementary message authentication codes do not match, the game is not verified as authentic and enters an error mode, is terminated and/or system operating personnel are notified, indicated at 370. The individual files are not changed in any way. The control file simply gives the order of operation and the filenames.

Figure 12:
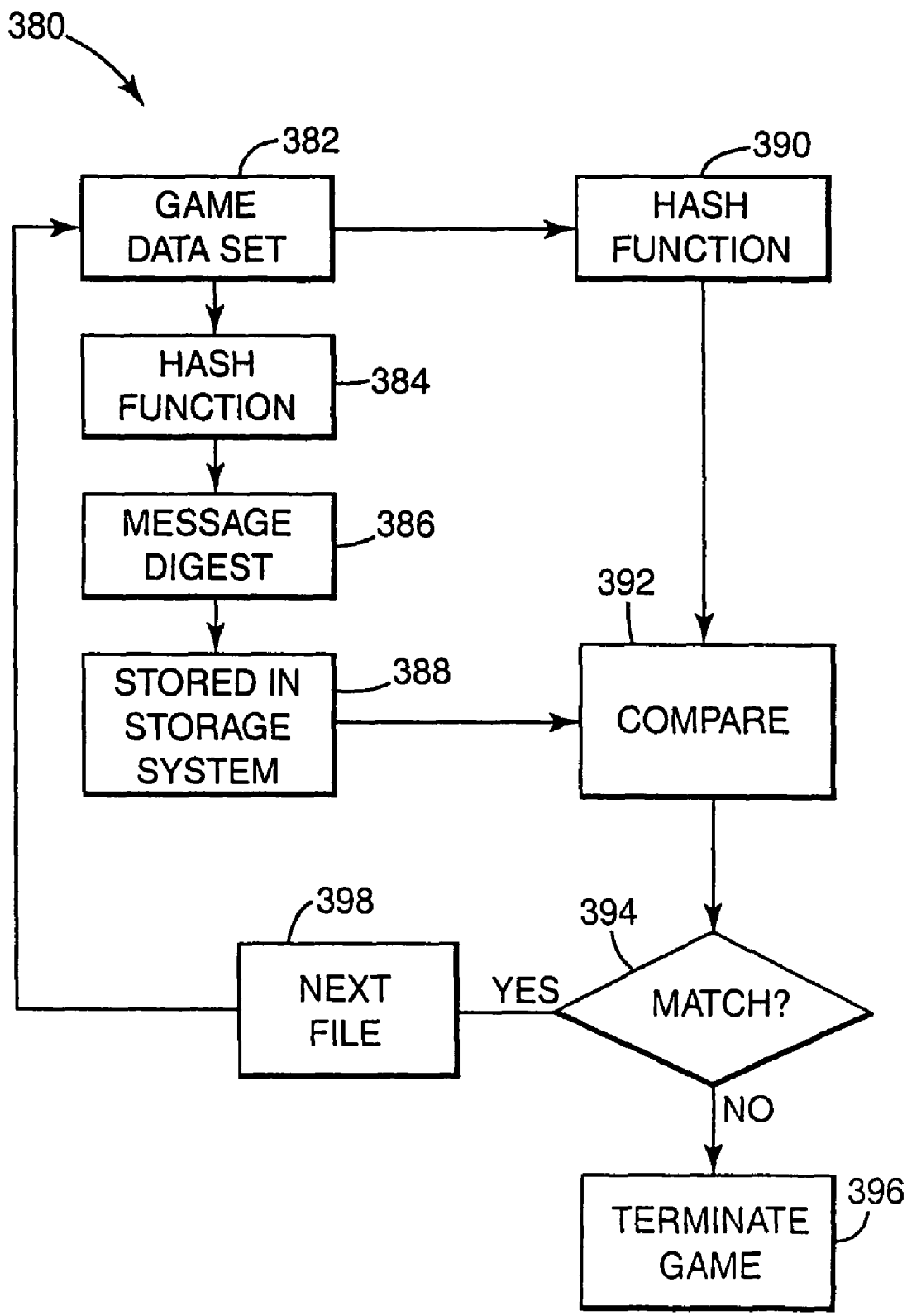
FIG. 12 is a diagram illustrating one exemplary embodiment of a process for verifying a game program in a gaming system according to the present invention.

In FIG. 12, one exemplary embodiment of a game verification process used in a gaming system according to the present invention is generally shown at 380. In verification process 380, after the game data set 382 has been authenticated and transferred into RAM 203, the present invention provides for continuous verification of the game data set to assure that the game data set 382 has not changed from the original game data set stored in nonvolatile memory 204. In particular, a hash function 384 is applied to the game data set 382, resulting in a hashed output stored in message digest 386. Message digest 386 comprises a unique hashed output corresponding to each program file in game data set 382. It is to be noted that this does not produce a signature, as a signature requires encryption of the hash value, which is not performed in this process. In one aspect, hash function 384 is a SHA hash function. Other suitable hash functions include MD5, SNEFRU, HAVAL and N-HASH. Other hash functions which are suitable for use in the verification process according to the present invention will become apparent to one skilled in the art after reading the present application. The hashed output or message digest 386 is stored in a storage system 388. The storage system 388 may include message digest 386 being stored in RAM 203 or in VRAM 308 or other suitable storage system which is part of gaming system 100.

During operation of the gaming system, the gaming data set 382 may be continuously verified to determine that no change has occurred in the game data set. In one aspect, the game data set 382 is verified one file at a time. In particular, during operation of the gaming system, a program file is applied to hash function 390, wherein hash function 390 is the same as hash function 394. At 392, the hashed output of hash function 390 is compared to the corresponding hashed output stored at system 388. At 394, if no match occurs the game enters into an error mode, is terminated, and/or gaming personnel are notified, indicated at 396. At 398, if a match occurs the next program file of game data set 382 is verified in a similar manner. As such, the game data set 382 is continuously verified during operation of the gaming system. Another aspect, the game data set may be verified using the verification process according to the present invention at desired time intervals or upon the occurrence of a desired event, such as the start of each game played on the gaming system.

The gaming system 100 according to the present invention provides a unique system and method for preparing a game data set for authentication and authenticating a game used in the gaming system 100. The gaming system 100 includes a process which securely verifies that the gaming set, including program files have not been altered, either intentionally or unintentionally, which could result in the changing of the outcome of a game played on the gaming system 100. In one aspect, the present invention provides for continuous verification of the gaming system 100 during operation of the gaming system 100.

Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the invention. It is intended that this invention be limited only by the claims, and the full scope of equivalents thereof.

What is claimed is:

1. A game apparatus comprising:
a game controller comprising:
a processor for executing a game program wherein the game controller is operable to control a wagering game;
a first memory for providing an executable space for the processor;
a second memory for storing game information wherein game controller is operable to copy the game information from the second memory to first the memory and wherein the game controller is operable to compute an abbreviated bit string that is unique to the game information stored in the first memory and to compare the abbreviated bit string to a reference abbreviated bit string using a continuously executing program thread executing on the game controller during play of the wagering game to ensure that the game information copied to the first memory has not changed since it was copied to the first memory, and
wherein the game controller is further operable to track used and unused portions of the first memory and to zero out the unused portions of the first memory.

2. The game apparatus of claim 1, wherein the game apparatus is brought to a tilt state if the abbreviated bit string is not the same as the reference abbreviated bit string.

3. The game apparatus of claim 1, wherein first memory is volatile memory.

4. The game apparatus of claim 1, wherein second memory is non-volatile memory.

5. The game apparatus of claim 4, wherein second memory is one of a flash memory or a disk memory.

6. The game apparatus of claim 1, wherein the reference abbreviated bit string is stored in the second memory.

7. The game apparatus of claim 1, wherein the reference abbreviated bit string is stored in a non-volatile memory separate from the second memory or the first memory.

8. The game apparatus of claim 1, the first memory is a random access memory.

9. The game apparatus of claim 1, further comprising a network interface for communicating with one or more remote devices.

10. The game apparatus of claim 9, wherein the second memory is a remote memory and the game controller is operable to copy the game information from the remote memory via the network interface.

11. The game apparatus of claim 9, wherein the game controller is operable to copy the game information to a remote memory via the network interface.

12. The game apparatus of claim 1, wherein the game information includes game state data.

13. The game apparatus of claim 1, wherein the abbreviated bit string is computed using a hash function.

14. The game apparatus of claim 1, wherein the game information comprises one or more of game code, game data, game sound, game graphics, game configuration files, game operating system code or combinations thereof.

15. A game system comprising:
  a second memory for storing game information including executable game code;
  a game controller comprising:
    a processor for executing a game program wherein the game controller is operable to control a wagering game;
    a first memory for providing an executable space for the processor;
    an interface for communicating with the memory wherein the game controller is operable to copy the game information including the executable game code from the memory to the first memory and wherein the game controller is operable to compute an abbreviated bit string that is unique to the game information stored in the first memory and to compare the abbreviated bit string to a reference abbreviated bit string using a continuously executing program thread executing on the game controller during play of the wagering game to ensure that the game information copied to the first memory has not changed since it was copied to the first memory; and
  wherein the game controller is further operable to track used and unused portions of the first memory and to zero out the unused portions of the first memory.

* * * * *